US011987061B2

(12) United States Patent
Iwanami

(10) Patent No.: US 11,987,061 B2
(45) Date of Patent: May 21, 2024

(54) IMAGE FORMING APPARATUS, IMAGE FORMING METHOD, AND STORAGE MEDIUM

(71) Applicant: Satoshi Iwanami, Kanagawa (JP)

(72) Inventor: Satoshi Iwanami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/170,007

(22) Filed: Feb. 16, 2023

(65) Prior Publication Data

US 2023/0264482 A1 Aug. 24, 2023

(30) Foreign Application Priority Data

Feb. 21, 2022 (JP) ................................ 2022-025050

(51) Int. Cl.
*B41J 2/21* (2006.01)
*B41J 2/045* (2006.01)

(52) U.S. Cl.
CPC ......... *B41J 2/2135* (2013.01); *B41J 2/04505* (2013.01)

(58) Field of Classification Search
CPC ...... B41J 2/04586; B41J 2/2135; B41J 11/46; B41J 19/145; B41J 29/02; B41J 29/13; B41J 2/04505; B41J 2/2103; B41J 29/393; B41J 3/407; B41J 3/4073; B41J 2/1433; B41J 2/512; B41J 11/42; B41J 2/162; B41J 2002/14475; B41J 19/207; A45D 2029/005; A45D 29/00
See application file for complete search history.

(56) References Cited

U.S. PATENT DOCUMENTS

| | | | | |
|---|---|---|---|---|
| 2012/0250040 | A1* | 10/2012 | Yamazaki .............. | B41J 2/2142 358/1.14 |
| 2013/0135484 | A1* | 5/2013 | Satoh ........................ | G01J 3/46 348/207.2 |
| 2013/0229671 | A1 | 9/2013 | Yokozawa et al. | |
| 2013/0258368 | A1 | 10/2013 | Shigemoto et al. | |

(Continued)

FOREIGN PATENT DOCUMENTS

| | | |
|---|---|---|
| JP | 2018-083334 | 5/2018 |
| JP | 2018-083405 | 5/2018 |
| JP | 2020-055301 | 4/2020 |

*Primary Examiner* — Kristal Feggins
(74) *Attorney, Agent, or Firm* — Harness, Dickey & Pierce, P.L.C.

(57) ABSTRACT

An image forming apparatus includes a recording head and processing circuitry. The recording head includes a plurality of nozzles. The processing circuitry prints a reference adjustment pattern on a recording medium using a reference nozzle, which is one of the nozzles. When the recording medium is conveyed from the reference nozzle in a sub-scanning direction by a predetermined conveyance amount, the processing circuitry prints an adjustment pattern on the recording medium using a designated nozzle, which is apart by a predetermined distance with respect to a nozzle apart from the reference nozzle in the sub scanning direction by the predetermined conveyance amount. The processing circuitry detects the reference adjustment pattern and the adjustment pattern, computes a distance between the reference adjustment pattern and the adjustment pattern in the sub-scanning direction, and determines whether a standard deviation of the distance computed is equal to or larger than a predetermined value.

7 Claims, 16 Drawing Sheets

(56) References Cited

U.S. PATENT DOCUMENTS

| | | | |
|---|---|---|---|
| 2013/0258369 A1 | 10/2013 | Suzuki et al. | |
| 2015/0085305 A1 | 3/2015 | Suzuki et al. | |
| 2015/0109646 A1 | 4/2015 | Yokozawa et al. | |
| 2017/0165959 A1* | 6/2017 | Ueshima | B41J 2/2146 |
| 2018/0141329 A1 | 5/2018 | Aoyagi et al. | |
| 2019/0163112 A1 | 5/2019 | Nikaku et al. | |
| 2019/0166274 A1 | 5/2019 | Ishii et al. | |
| 2019/0166275 A1 | 5/2019 | Ishii et al. | |
| 2019/0283469 A1 | 9/2019 | Fujii et al. | |
| 2019/0294935 A1 | 9/2019 | Iwanami et al. | |
| 2020/0101736 A1 | 4/2020 | Satoh et al. | |

* cited by examiner

IMAGE FORMING APPARATUS, IMAGE FORMING METHOD, AND STORAGE MEDIUM

CROSS-REFERENCE TO RELATED APPLICATION

This patent application is based on and claims priority pursuant to 35 U.S.C. § 119(a) to Japanese Patent Application No. 2022-025050, filed on Feb. 21, 2022, in the Japan Patent Office, the entire disclosure of which is hereby incorporated by reference herein.

BACKGROUND

Technical Field

Embodiments of the present disclosure relate to an image forming apparatus, an image forming method, and a storage medium.

Related Art

Conventionally, for an image forming apparatus, various techniques have been proposed to detect with high precision a deviation amount of an image generated at a time of image formation on a recording medium.

In a case where discharge of liquid, such as ink, from a nozzle is deflected at a time of image formation of a pattern for detecting a deviation amount of an image, it may be difficult for conventional image deviation amount detection techniques to accurately detect the deviation amount of the image.

SUMMARY

In an embodiment of the present disclosure, there is provided an image forming apparatus includes a recording head and processing circuitry. The recording head includes a plurality of nozzles. The processing circuitry prints a reference adjustment pattern on a recording medium using a reference nozzle, which is one of the plurality of nozzles. When the recording medium is conveyed from the reference nozzle in a sub-scanning direction by a predetermined conveyance amount, the processing circuitry prints an adjustment pattern on the recording medium using a designated nozzle, which is one of the plurality of nozzles and apart by a predetermined distance with respect to a nozzle apart from the reference nozzle in the sub scanning direction by the predetermined conveyance amount. Then the processing circuitry detects the reference adjustment pattern and the adjustment pattern, computes a distance between the reference adjustment pattern and the adjustment pattern in the sub-scanning direction, and determines whether a standard deviation of the distance computed is equal to or larger than a predetermined value.

In another embodiment of the present disclosure, there is provided an image forming method to be executed by an image forming apparatus including a recording head having a plurality of nozzles. The image forming method prints a reference adjustment pattern on a recording medium using a reference nozzle, which is one of the plurality of nozzles. When the recording medium is conveyed from the reference nozzle in a sub-scanning direction by a predetermined conveyance amount, the image forming method prints an adjustment pattern on the recording medium using a designated nozzle, which is one of the plurality of nozzles and apart by a predetermined distance with respect to a nozzle apart from the reference nozzle in the sub-scanning direction by the predetermined conveyance amount. The image forming method detects the reference adjustment pattern and the adjustment pattern, computes a distance between the reference adjustment pattern and the adjustment pattern in the sub-scanning direction, and determines whether a standard deviation of the distance between the reference adjustment pattern and the adjustment pattern is equal to or larger than a predetermined value.

In another embodiment of the present disclosure, a non-transitory storage medium storing a plurality of instructions which, when executed by one or more processors, causes the processors to perform a method. The method includes, printing a reference adjustment pattern, printing an adjustment pattern, detecting, computing, and determining. The printing a reference adjustment pattern prints a reference adjustment pattern on a recording medium using a reference nozzle, which is one of a plurality of nozzles of a recording head. When the recording medium is conveyed from the reference nozzle in a sub-scanning direction by a predetermined conveyance amount, the printing an adjustment pattern prints an adjustment pattern on the recording medium using a designated nozzle, which is one of the plurality of nozzles and apart by a predetermined distance with respect to a nozzle apart from the reference nozzle in the sub-scanning direction. The detecting detects the reference adjustment pattern and the adjustment pattern. The computing computes a distance between the reference adjustment pattern and the adjustment pattern in the sub-scanning direction. The determining determines whether a standard deviation of the distance between the reference adjustment pattern and the adjustment pattern is equal to or larger than a predetermined value.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 is a perspective view illustrating an example of the inside of an image forming apparatus according to a present embodiment seen through;

Figure 1:
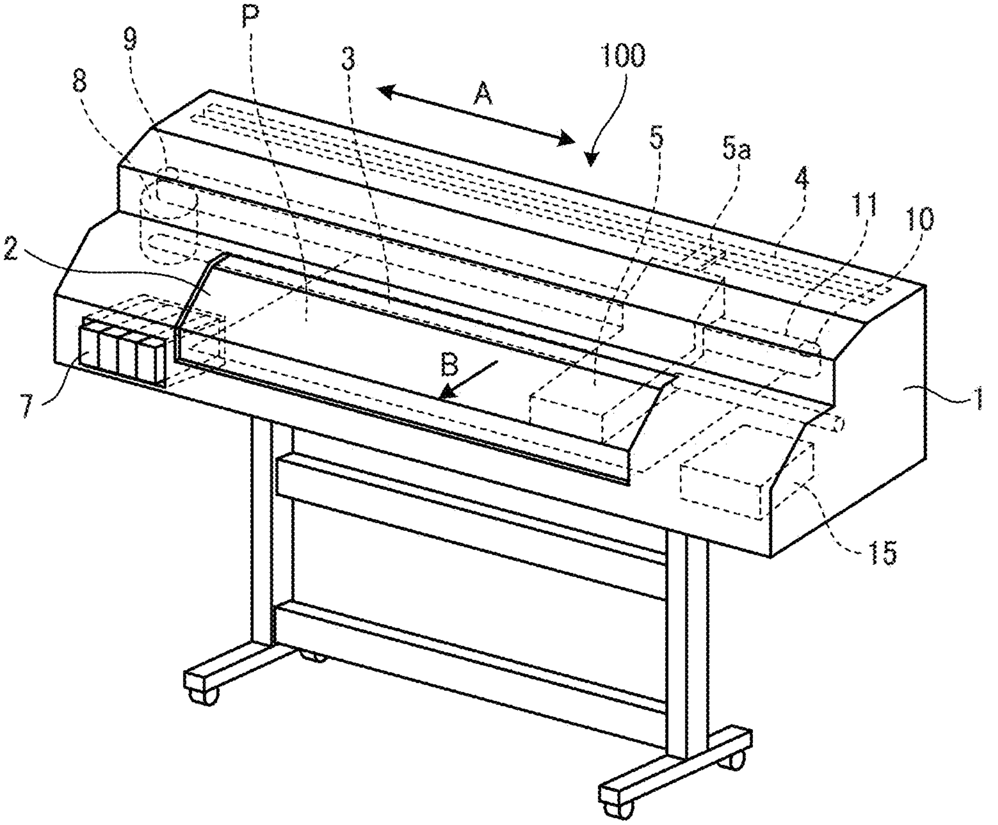

The accompanying drawings are intended to depict embodiments of the present disclosure and should not be interpreted to limit the scope thereof. The accompanying drawings are not to be considered as drawn to scale unless explicitly noted.

DETAILED DESCRIPTION

Hereinafter, an image forming apparatus, an image forming method, and a storage medium for image forming according to embodiments of the present disclosure are described in detail with reference to the accompanying drawings. Further, the embodiments described below are some examples of an image forming apparatus for embodying the technical idea of the disclosure, and embodiments of the disclosure are not limited to the embodiments described below. The dimensions, materials, shapes, relative configurations, and the like of the components described below are just intended to be illustrative and do not limit the scope of the invention, unless otherwise specified. The sizes, positional relationships, and the like of members illustrated in the drawings may be magnified for clarity of description. In the following description, the same names and reference numerals indicate the same or similar members, and detailed description thereof will be omitted as appropriate.

First, a mechanical configuration example of an image forming apparatus according to the present embodiment will be described with reference to FIGS. 1 to 3.

As illustrated in FIG. 1, an image forming apparatus 100 according to the present embodiment includes a carriage 5 that reciprocates in main-scanning directions (directions of arrows A in the drawing). The carriage 5 is supported by a main guide rod 3 extended along the main-scanning direction. The carriage 5 is provided with a coupling piece 5*a*. The coupling piece 5*a* engages with a subsidiary guide member 4 provided in parallel with the main guide rod 3, to stabilize the orientation of the carriage 5.

The carriage 5 is coupled to a timing belt 11 hung and stretched between a driving pulley 9 and a driven pulley 10. The driving pulley 9 is rotated by driving of a main-scanning motor 8. The driven pulley 10 has a mechanism for adjusting the distance between the driven pulley 10 and the driving pulley 9, and has a role of applying a predetermined tension to the timing belt 11. The driving of the main-scanning motor 8 feeds the timing belt 11, so that the carriage 5 reciprocates in the main-scanning directions. As illustrated in FIG. 2, a main-scanning encoder sensor 131 provided for the carriage 5 detects marks on an encoder sheet 14 to output an encoder value. On the basis of, for example, the encoder value, the moving amount and moving speed of the carriage 5 are controlled.

Figure 3:
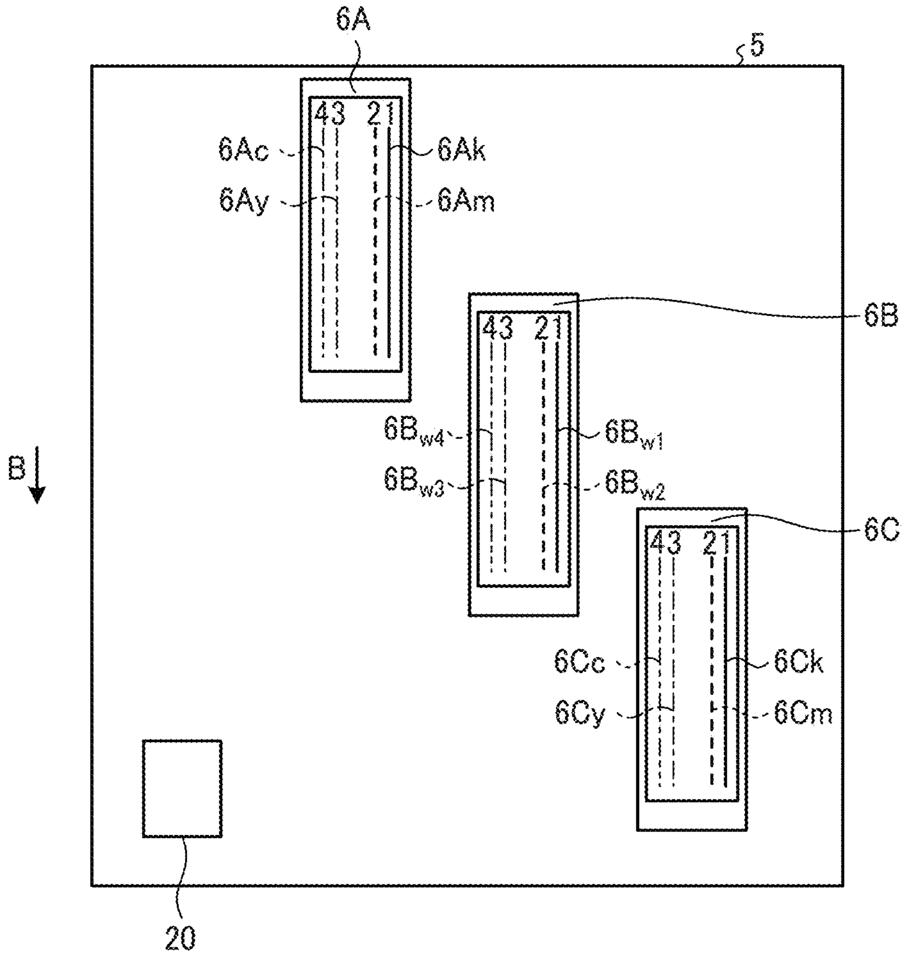
FIG. 3 is an explanatory diagram of an example of a carriage of the image forming apparatus according to the present embodiment.

As illustrated in FIG. 3, the carriage 5 includes recording heads 6A, 6B, and 6C. The recording head 6A includes a nozzle row 6Ay including a large number of aligning nozzles that discharge a yellow (Y) ink, a nozzle row 6Ac including a large number of aligning nozzles that discharge a cyan (C) ink (an example of a liquid), a nozzle row 6Am including a large number of aligning nozzles that discharge a magenta (M) ink, and a nozzle row 6Ak including a large number of aligning nozzles that discharge a black (K) ink. Hereinafter, these recording heads 6A, 6B, and 6C will be collectively referred to as the recording heads 6. The recording heads 6 are supported by the carriage 5 such that discharge surfaces (nozzle surfaces) of the recording heads 6 face downward (toward a recording medium P).

The carriage 5 does not include cartridges 7, which are ink supply members for supplying the inks to the recording heads 6. The cartridges 7 are arranged at a predetermined position in the image forming apparatus 100. The cartridges 7 and the recording heads 6 are coupled by pipes. The inks are supplied to the recording heads 6 from the cartridges 7 via the pipes.

Figure 2:
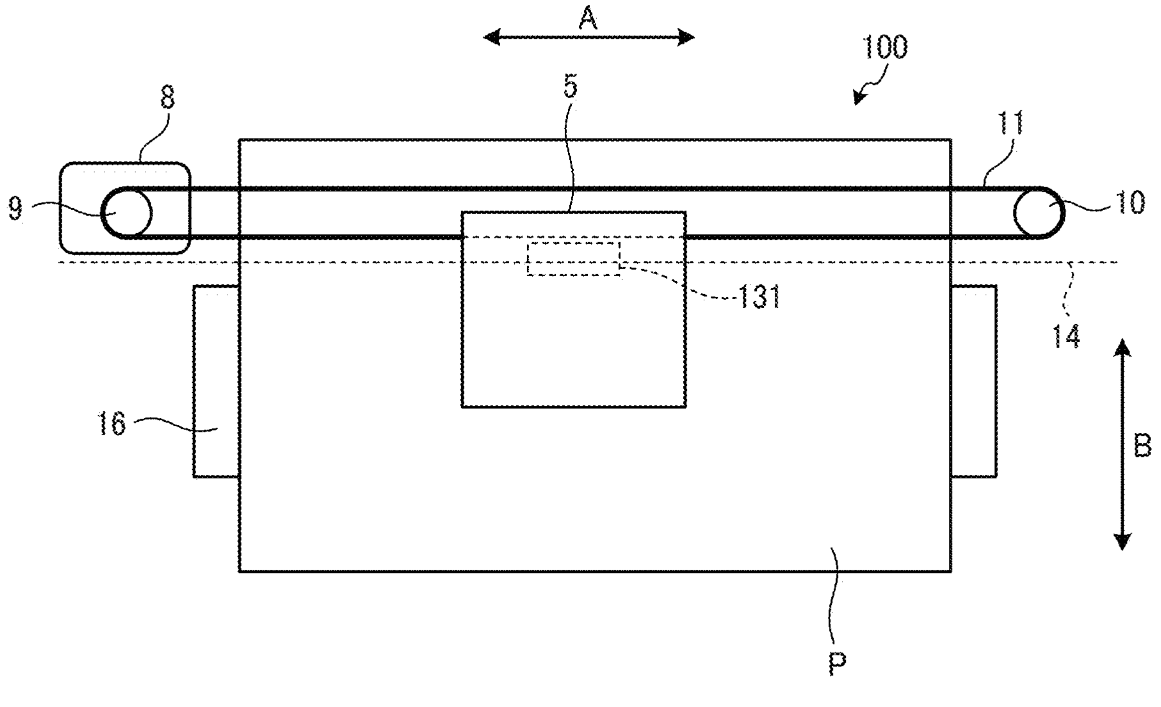
FIG. 2 is a top view illustrating an example of an internal mechanical configuration of the image forming apparatus according to the present embodiment.

As illustrated in FIG. 2, a platen 16 is provided at a position facing the discharge surfaces of the recording heads 6. The platen 16 supports a recording medium P when the inks are discharged from the recording heads 6 onto the recording medium P. The platen 16 has a large number of through holes through in a thickness direction, and rib-shaped projections surrounding each through hole. A suction fan provided on a side opposite to a surface of the platen 16 that supports a recording medium P is operated to prevent the recording medium P falling off from the upper surface of the platen 16. A recording medium P is sandwiched and supported by a conveyance roller driven by a sub-scanning motor 12 (see FIG. 13) to be described later, and is intermittently conveyed on the platen 16 in sub-scanning directions (directions of arrows B in the drawing). As described above, the recording heads 6 are provided with the large number of nozzles aligning in the sub-scanning direction.

The image forming apparatus 100 according to the present embodiment intermittently conveys a recording medium P in the sub-scanning directions, and during the stop of the conveyance of the recording medium P, reciprocates the carriage 5 in the main-scanning directions while selectively driving the nozzles of the recording heads 6 according to the image data to discharge the inks from the recording heads 6 onto the recording medium P on the platen 16 to record an image on the recording medium P. The image forming apparatus 100 according to the present embodiment also includes a preserving mechanism 15 for preserving the reliability of the recording heads 6. The preserving mechanism 15 performs cleaning and capping of the discharge surfaces of the recording heads 6, ejection of unnecessary inks from the recording heads 6, and the like. As illustrated in FIG. 3, the carriage 5 also includes a capturing unit 20 for capturing a test pattern TP (see FIG. 15), which will be described later, on a recording medium P. Details of the capturing unit 20 will be described later.

The above-described components constituting the image forming apparatus 100 according to the present embodiment are arranged inside an outer case 1. The outer case 1 includes a cover member 2 that is openable and closable. At a time of maintenance of the image forming apparatus 100 and at a time of occurrence of a paper jam, the cover member 2 is opened, so that work is performed on each component provided inside the outer case 1.

The capturing unit 20 illustrated in FIG. 3 may or may not include a reference chart to be simultaneously captured with the test pattern TP. The reference chart is, for example, a chart for computing colorimetric values of the test pattern TP using red green, and blue (RGB) values of each reference patch (see FIG. 9).

Figure 4:
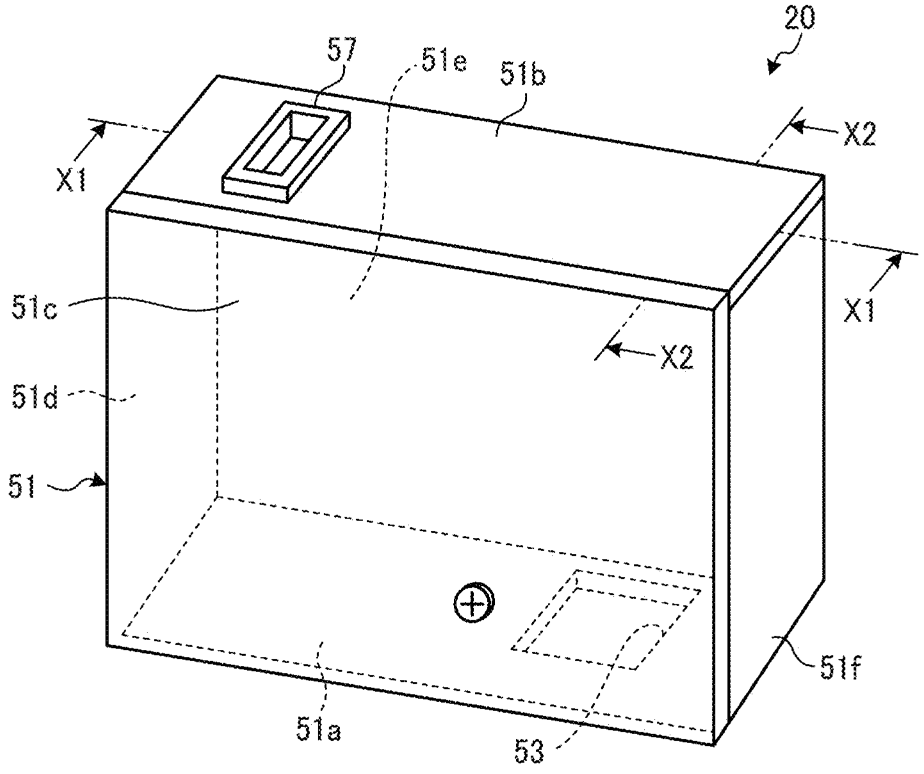
FIG. 4 is a perspective view illustrating an appearance of an example of a capturing unit according to the present embodiment.
Figure 5:
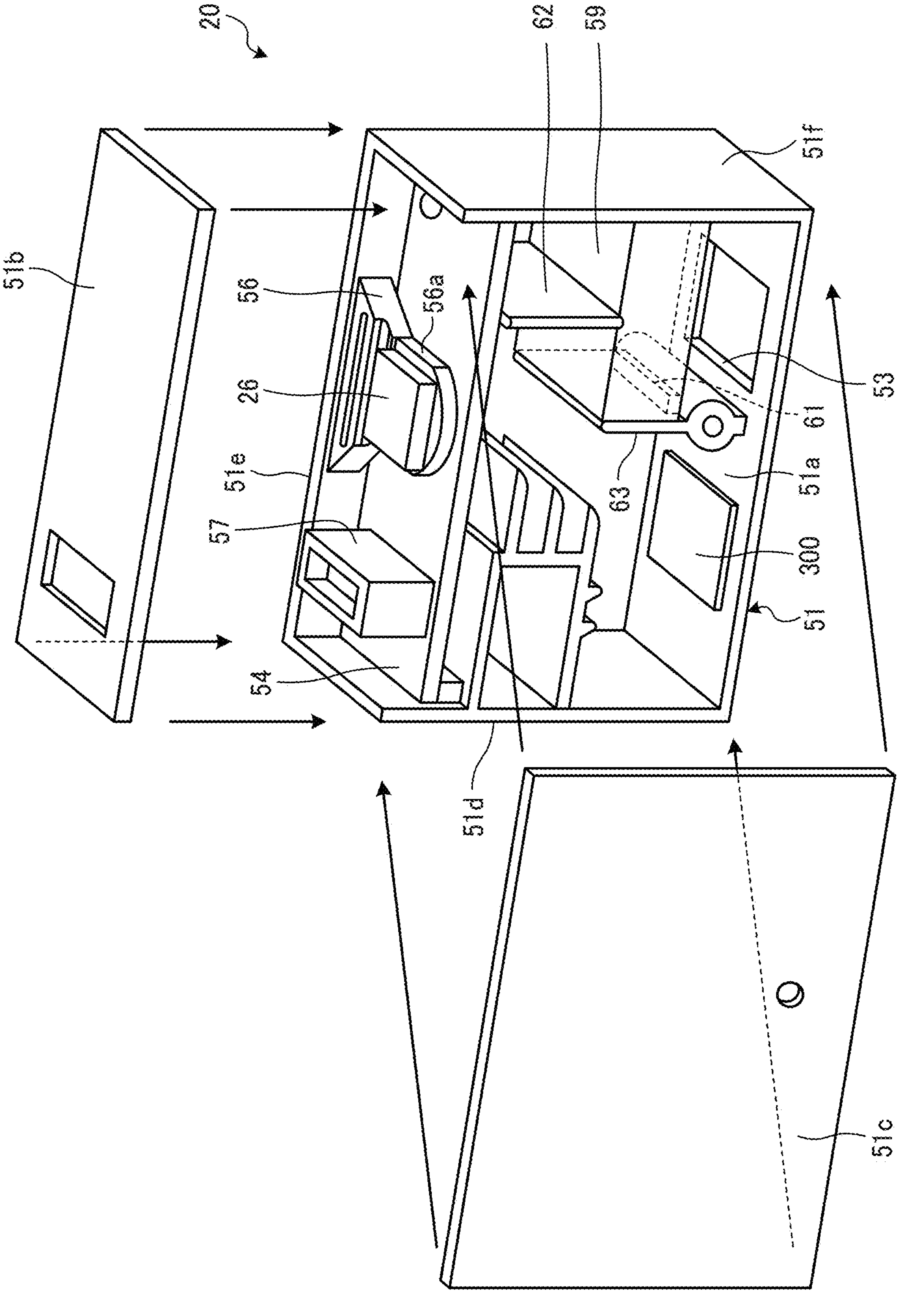
FIG. 5 is an exploded perspective view of an example of the capturing unit according to the present embodiment.
Figure 6:
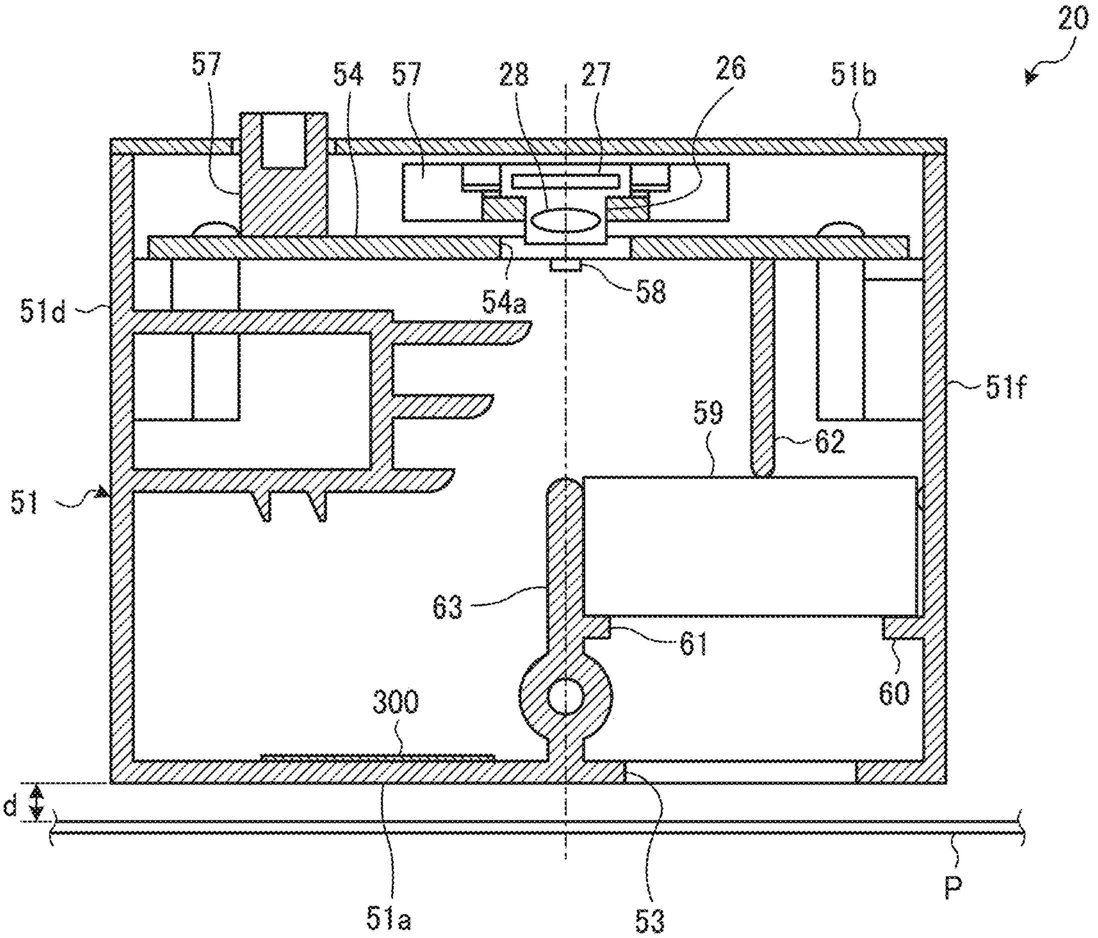
FIG. 6 is a vertical cross-sectional view of the capturing unit viewed in an X1 direction in FIG. 4.
Figure 7:
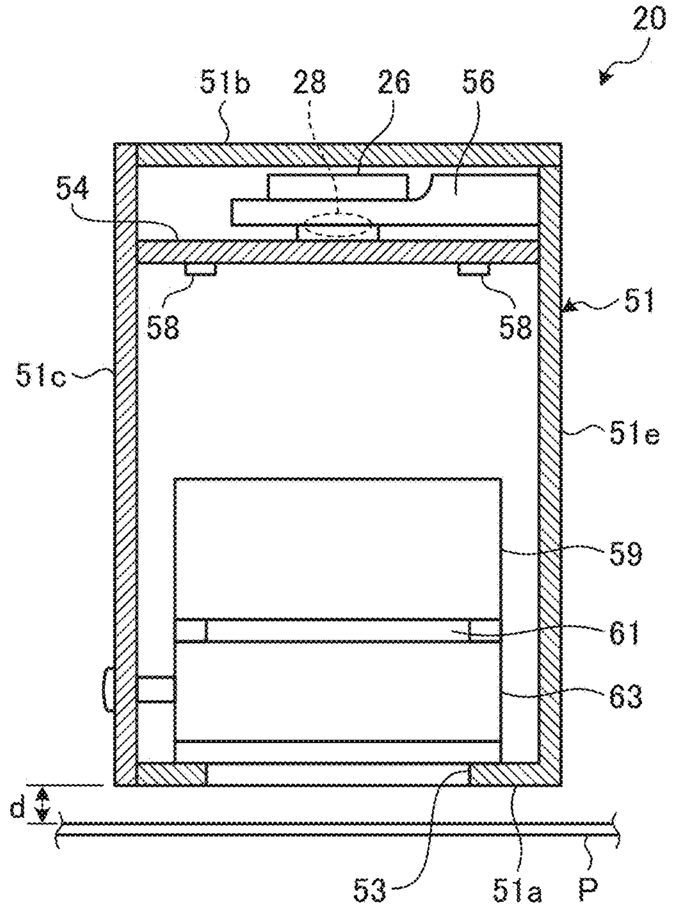
FIG. 7 is a vertical cross-sectional view of the capturing unit viewed in an X2 direction in FIG. 4.
Figure 8:
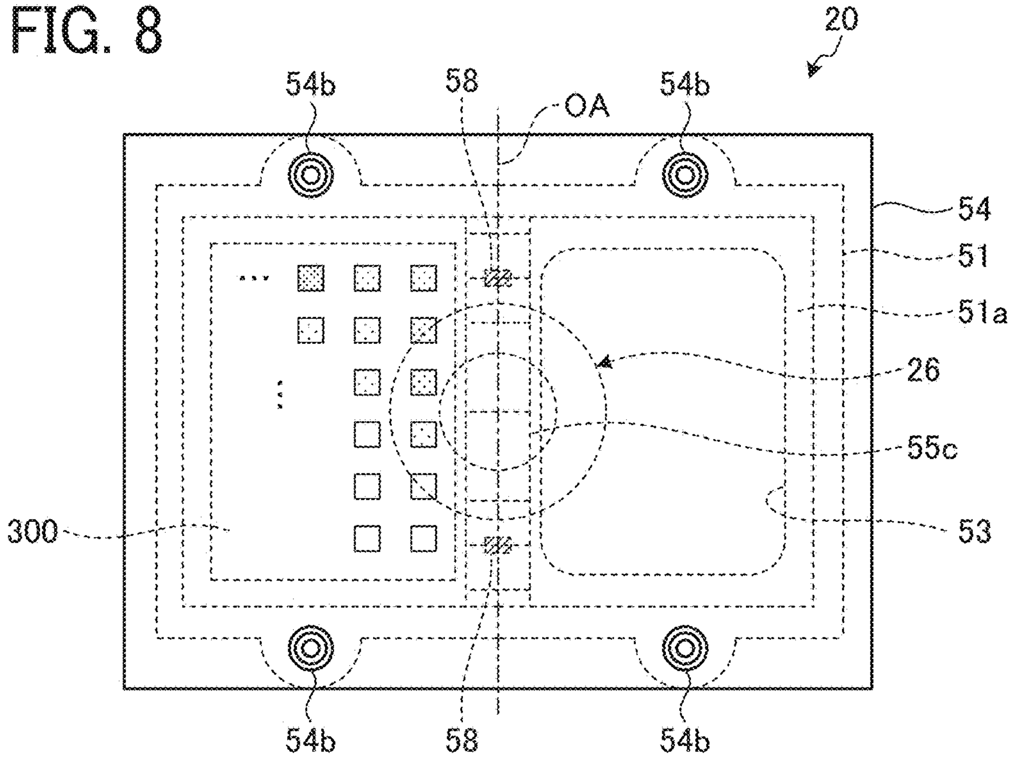
FIG. 8 is a plan view of the capturing unit according to the present embodiment.

Next, a specific example of the capturing unit 20 including the reference chart will be described. FIG. 4 is a perspective view illustrating an appearance of an example of the capturing unit according to the present embodiment. FIG. 5 is an exploded perspective view of an example of the capturing unit according to the present embodiment. FIG. 6 is a vertical cross-sectional view of the capturing unit viewed in an X1 direction in FIG. 4. FIG. 7 is a vertical cross-sectional view of the capturing unit viewed in an X2 direction in FIG. 4. FIG. 8 is a plan view of the capturing unit according to the present embodiment.

The capturing unit 20 includes a housing 51 in, for example, a rectangular box shape. The housing 51 includes, for example, a bottom board 51*a* and a top board 51*b* facing each other with a predetermined interval between the bottom board 51*a* and the top board 51*b*, and side walls 51*c*, 51*d*, 51*e*, and 51*f* coupling the bottom board 51*a* to the top board 51*b*. The bottom board 51*a* and the side walls 51*d*, 51*e*, and 51*f* of the housing 51 are integrally formed by, for example, molding. The top board 51*b* and the side wall 51*c* are detachable. FIG. 5 illustrates a state where the top board 51*b* and the side wall 51*c* are detached.

For example, the capturing unit 20 in a state where part of the housing 51 is supported by a predetermined support is installed in a conveyance path of a recording medium P on which a test pattern TP has been formed. At this time, as illustrated in FIGS. 6 and 7, the capturing unit 20 is supported by the predetermined support such that the bottom board 51*a* of the housing 51 faces the conveyed recording medium P via a gap d, and the bottom board 51*a* is substantially parallel to the conveyed recording medium P.

The bottom board 51*a* of the housing 51 facing a recording medium P on which a test pattern TP has been formed is provided with an opening 53 to allow the test pattern TP outside the housing 51 to be captured from the inside of the housing 51.

On the inner surface side of the bottom board 51*a* of the housing 51, a reference chart 300 is arranged adjacent to the opening 53 via a support member 63. The reference chart 300 is captured together with a test pattern TP by a sensor unit 26 described later when colorimetry of the test pattern TP and acquisition of the RGB values are performed. Details of the reference chart 300 will be described later.

In the housing 51, arranged on the top board 51*b* side is a circuit board 54. As illustrated in FIG. 8, secured to the circuit board 54 with fastening members 54*b* is the housing 51 that is in a rectangular box shape and has an open side on the circuit board 54 side. The housing 51 is not limited to the rectangular box shape, and may be, for example, a cylindrical box shape, an elliptical cylindrical box shape, or the like having a bottom board 51*a* having an opening 53.

The sensor unit 26 that captures an image is arranged between the top board 51*b* of the housing 51 and the circuit board 54. As illustrated in FIG. 6, the sensor unit 26 includes a two-dimensional sensor 27, such as a charge-coupled device (CCD) sensor or a complementary metal-oxide semiconductor (CMOS) sensor, and an imaging forming lens 28 that forms an optical image of a captured range captured by the sensor unit 26, on a light receiving surface (capturing region) of the two-dimensional sensor 27. The two-dimensional sensor 27 is a light receiving element array including light receiving elements that receive reflected light from a subject and are two-dimensionally arrayed.

The sensor unit 26 is held by, for example, a sensor holder 56 formed integrally with the side wall 51*e* of the housing 51. The sensor holder 56 is provided with a ring 56*a* at a position facing a through hole 54*a* of the circuit board 54. The ring 56*a* has a through hole having a size following the outer shape of a protruding portion of the sensor unit 26 on the imaging forming lens 28 side. The protruding portion of the sensor unit 26 on the imaging forming lens 28 side is inserted in the ring 56*a* of the sensor holder 56, so that the sensor unit 26 is held by the sensor holder 56 such that the imaging forming lens 28 faces the bottom board 51*a* side of the housing 51 via the through hole 54*a* of the circuit board 54.

At this time, the sensor unit 26 is held in a state where the sensor unit 26 is positioned by the sensor holder 56 such that the optical axis indicated by a dashed-dotted line in FIG. 6 is substantially perpendicular to the bottom board 51*a* of the housing 51, and the opening 53 and the reference chart 300 to be described later are included in the captured range. As a result, the sensor unit 26 captures, in part of the capturing region of the two-dimensional sensor 27, a test pattern TP outside the housing 51 via the opening 53. The sensor unit 26 also captures, in another part of the capturing region of the two-dimensional sensor 27, the reference chart 300 arranged inside the housing 51.

The sensor unit 26 is electrically coupled, via, for example, a flexible cable, to the circuit board 54 on which various electronic components are mounted. The circuit board 54 is also provided with an external-coupling connector 57 to which a coupling cable for coupling the capturing unit 20 to a main control board of the image forming apparatus 100 is attached. In the capturing unit 20, a pair of light sources 58 are disposed on the circuit board 54 at positions that are on a center line OA in the sub-scanning direction passing through the center of the sensor unit 26, and are apart from the center of the sensor unit 26 by a predetermined amount in the sub-scanning directions at equal intervals. The light sources 58 substantially uniformly illuminate the captured range captured by the sensor unit 26 at a time of capturing by the sensor unit 26. Used as the light sources 58 are, for example, light-emitting diodes (LEDs) useful for space saving and power saving.

As illustrated in FIGS. 7 and 8, in the present embodiment, used as the light sources 58 are a pair of LEDs evenly arranged, with the center of the imaging forming lens 28 as the reference, in a direction orthogonal to the direction in which the opening 53 and the reference chart 300 align.

The two LEDs used as the light sources 58 are mounted on, for example, a surface of the circuit board 54 on the bottom board 51*a* side. However, it is sufficient if the light sources 58 are arranged at positions where the light sources 58 substantially uniformly illuminate, with diffused light beams, the captured range captured by the sensor unit 26. The light sources 58 may not necessarily be directly mounted on the circuit board 54. The positions of the two LEDs are arranged at symmetrical positions with the two-dimensional sensor 27 as the center, so that a captured surface is captured under the same illumination condition as the illumination condition on the reference chart 300 side. In the present embodiment, the LEDs are used as the light sources 58, but the type of the light sources 58 is not limited to the LEDs. For example, organic electroluminescence (EL) or the like may be used as the light sources 58. In a case where the organic EL is used as the light sources 58, since illumination light beams close to the spectral distribution of sunlight is obtained, an improvement in colorimetric precision is expected.

As illustrated in FIG. 8, the sensor unit 26 also includes a light absorber 55*c* immediately under the light sources 58 and the two-dimensional sensor 27. The light absorber 55*c* reflects, to a direction other than the two-dimensional sensor 27, light beams from the light sources 58, or absorbs light beams from the light sources 58. The light absorber 55*c* has an acute shape, is formed such that light beams entering from the light sources 58 are reflected to the inner surface of the light absorber 55*c*, and has a structure that does not reflect the entering light beams to the entering directions.

In the housing 51, an optical-path-length-varying member 59 is arranged in an optical path between the sensor unit 26 and a test pattern TP outside the housing 51 captured by the sensor unit 26 via the opening 53. The optical-path-length-varying member 59 is an optical element having a refractive index n and having sufficient transmittance for the light beams of the light sources 58. The optical-path-length-varying member 59 has a function of making the imaging forming surface of an optical image of a test pattern TP outside the housing 51, close to the imaging forming surface of an optical image of the reference chart 300 inside the housing 51. That is, in the capturing unit 20, the optical-path-length-varying member 59 is arranged in the optical path between the sensor unit 26 and the subject outside the housing 51, so that the optical path length is varied. As a result, the capturing unit 20 adjusts both the imaging forming surface of an optical image of a test pattern TP outside the housing 51, and the imaging forming surface of the reference chart 300 inside the housing 51, to the light receiving surface of the two-dimensional sensor 27 of the sensor unit 26. Therefore, the sensor unit 26 captures an image in which both a test pattern TP outside the housing 51 and the reference chart 300 inside the housing 51 are in focus.

As illustrated in FIG. 6, for example, both ends of a surface of the optical-path-length-varying member 59 on the bottom board 51*a* side are supported by a pair of ribs 60 and 61. A pressing member 62 is also arranged between a surface of the optical-path-length-varying member 59 on the top board 51*b* side and the circuit board 54, so that the optical-path-length-varying member 59 does not move inside the housing 51. The optical-path-length-varying member 59 is arranged so as to close the opening 53 provided through the bottom board 51*a* of the housing 51. Therefore, the optical-path-length-varying member 59 also has a function of preventing impurities, such as ink mist and dust, that have entered the housing 51 from the outside of the housing 51 via the opening 53, from adhering to the sensor unit 26, the light sources 58, the reference chart 300, and the like.

The mechanical configuration of the capturing unit 20 described above is merely an example, and is not limited thereto. It is sufficient if the capturing unit 20 captures a test pattern TP outside the housing 51 via the opening 53 with the sensor unit 26 provided inside the housing 51 at least while the light sources 58 provided inside the housing 51 are turned on. The capturing unit 20 is variously modified or changed with respect to the above configuration.

For example, in the capturing unit 20 described above, the reference chart 300 is arranged on the inner surface side of the bottom board 51*a* of the housing 51. However, an opening different from the opening 53 may be provided through the bottom board 51*a* of the housing 51 at the position where the reference chart 300 is arranged, and the reference chart 300 may be attached, from the outside of the housing 51, to the position where the opening is provided. In this case, the sensor unit 26 captures, via the opening 53, a test pattern TP on a recording medium P, and captures, via the opening different from the opening 53, the reference chart 300 attached, from the outside, to the bottom board 51*a* of the housing 51. In this example, there is an advantage that in a case where a defect, such as contamination, occurs in the reference chart 300, the replacement is easily performed.

Figure 9:
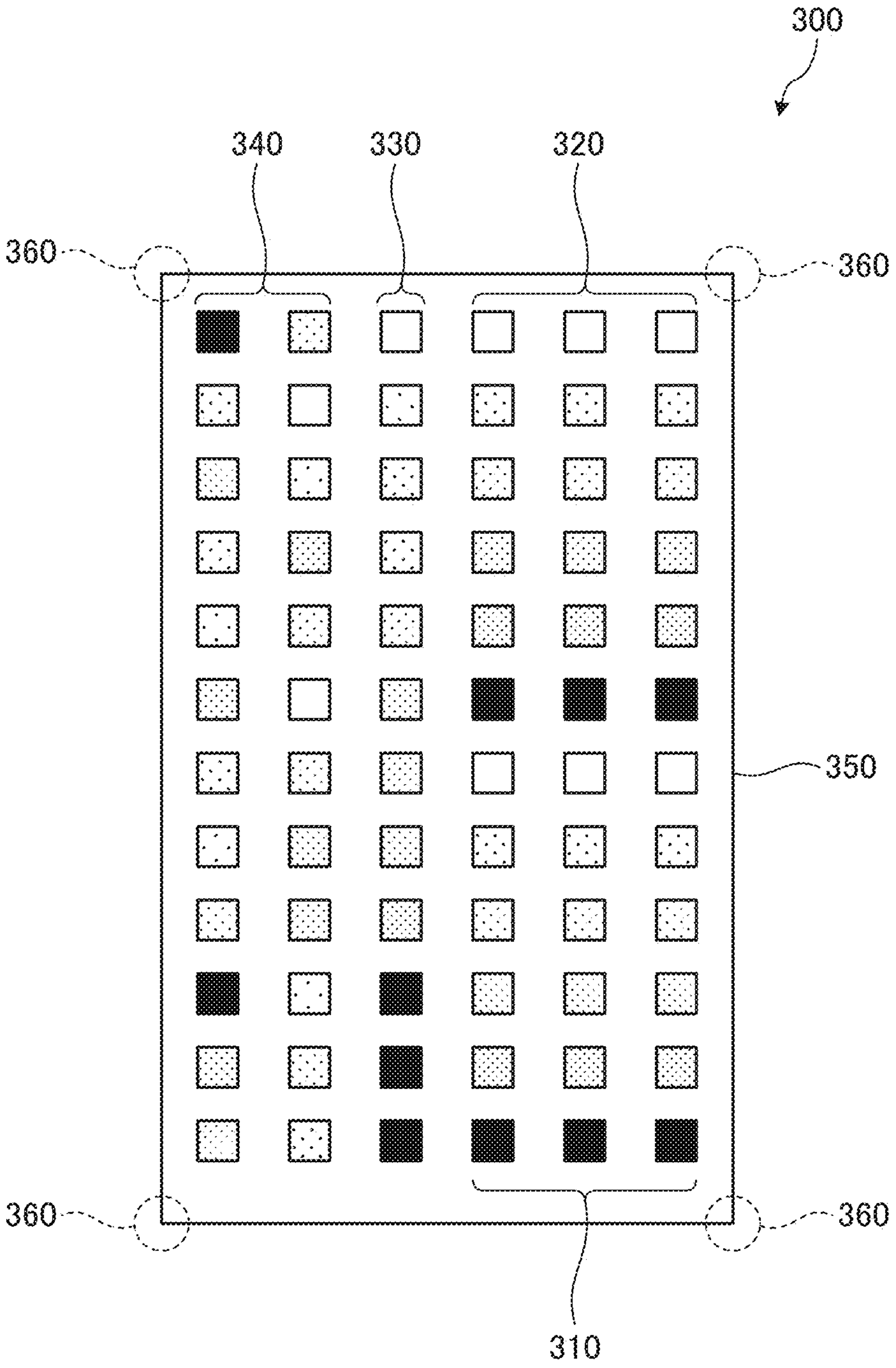
FIG. 9 is a diagram illustrating a specific example of a reference chart included in the image forming apparatus according to the present embodiment.

Next, a specific example of the reference chart 300 arranged in the housing 51 of the capturing unit 20 will be described with reference to FIG. 9. FIG. 9 is a diagram illustrating a specific example of the reference chart included in the image forming apparatus according to the present embodiment.

The reference chart 300 illustrated in FIG. 9 includes a plurality of colorimetric patch rows 310 to 340 in which colorimetric patches for the colorimetry are arrayed, a distance measurement line 350, and chart-position-identifying markers 360.

The colorimetric patch rows 310 to 340 include a colorimetric patch row 310 in which colorimetric patches of primary colors of YMCK are arrayed in gradation order, a colorimetric patch row 320 in which colorimetric patches of secondary colors of RGB are arrayed in gradation order, a colorimetric patch row (achromatic gradation pattern) 330 in which grayscale colorimetric patches are arrayed in gradation order, and a colorimetric patch row 340 in which colorimetric patches of tertiary colors are arrayed.

The distance measurement line 350 is formed as a rectangular frame surrounding the plurality of colorimetric patch rows 310 to 340. The chart-position-identifying markers 360 are provided at positions of four corners of the distance measurement line 350, and function as markers for identifying the position of each colorimetric patch. From an image of the reference chart 300 captured by the sensor unit 26, the distance measurement line 350 and the chart-position-identifying markers 360 at the four corners of the distance measurement line 350 are identified, so that the position of the reference chart 300 and the position of each colorimetric patch are identified.

Each colorimetric patch constituting the colorimetric patch rows 310 to 340 for the colorimetry is used as a reference of a hue reflecting the capturing conditions of the sensor unit 26. The configuration of the colorimetric patch rows 310 to 340 for the colorimetry arranged in the reference chart 300 is not limited to the example illustrated in FIG. 9, and any colorimetric patch rows are applied. For example, colorimetric patches that allow the possible widest color range to be identified may be used. The colorimetric patch row 310 of the primary color of YMCK, and the grayscale colorimetric patch row 330 may include patches of colorimetric values of color materials used for the image forming apparatus 100. The colorimetric patch row 320 of the secondary colors of RGB may include patches of colorimetric values colored by the color materials used in the image forming apparatus 100. A standard color chart in which colorimetric values, such as Japan Color, are defined may be used.

In the present embodiment, the reference chart 300 including the colorimetric patch rows 310 to 340 in the shape of general patches (color chart) is used, but the reference chart 300 may not necessarily include the colorimetric patch rows 310 to 340. It is sufficient if in the reference chart 300, a plurality of colors available for the colorimetry is arranged such that the positions of the colors are identified.

As described above, since the reference chart 300 is arranged, on the inner surface side of the bottom board 51*a* of the housing 51, adjacent to the opening 53, the sensor unit 26 simultaneously captures the reference chart 300 and a test pattern TP outside the housing 51. The simultaneous capturing here means that image data of one frame including a test pattern TP outside the housing 51 and the reference chart 300 is acquired. That is, even if there is a time difference in data acquisition for each pixel, if image data in which a test pattern TP outside the housing 51 and the reference chart 300 are included in one frame is acquired, the test pattern TP outside the housing 51 and the reference chart 300 are simultaneously captured.

Figure 10:
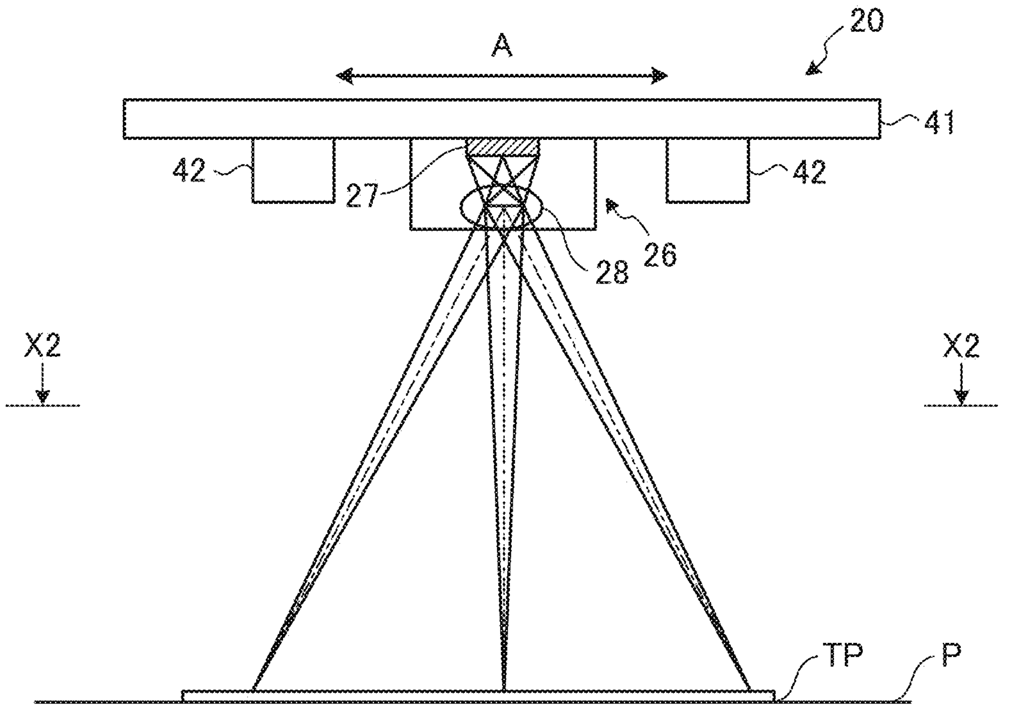
FIG. 10 is a vertical cross-sectional view of a capturing unit included in the image forming apparatus according to the present embodiment.
Figure 11:
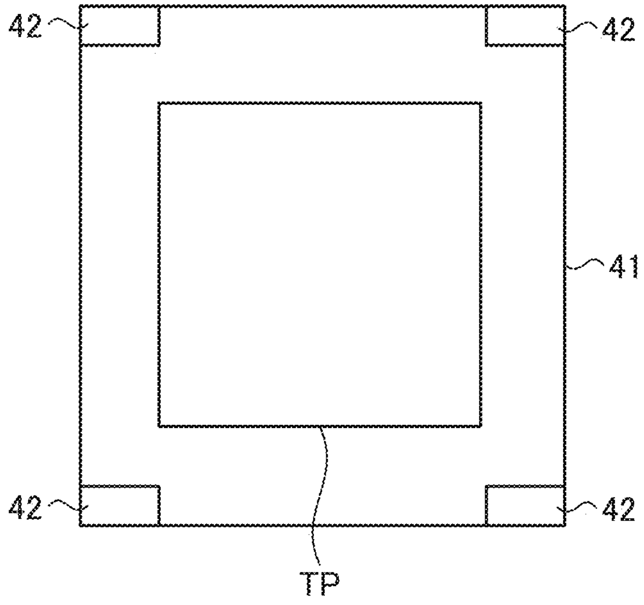
FIG. 11 is a plan view of the capturing unit in FIG. 10 as viewed in an X2 direction.

Next, a specific example of a capturing unit 20 that does not include the reference chart 300 will be described. Hereinafter, the specific example of the capturing unit 20 will be described in detail with reference to FIGS. 10 and 11. FIG. 10 is a vertical cross-sectional view of the capturing unit included in the image forming apparatus according to the present embodiment. FIG. 11 is a plan view of the capturing unit of FIG. 10 as viewed in an X2 direction.

As illustrated in FIG. 10, the capturing unit 20 includes light sources 42 and a sensor unit 26 mounted on a substrate 41 secured to the carriage 5. As the light sources 42, LEDs, for example, are used. The light sources 42 irradiate, with illumination light beams, a test pattern TP on a recording medium P, which is a subject, and the reflected light beams (diffused reflected light beams or regularly reflected light beams) enter the sensor unit 26. As illustrated in FIG. 11, the four light sources 42 are arranged so as to surround a test pattern TP on a recording medium P, and irradiate the test pattern TP with uniform illumination light beams.

The sensor unit 26 includes a two-dimensional sensor 27, such as a CCD sensor or a CMOS sensor, and an imaging forming lens 28. The sensor unit 26 makes reflected illumination light beams emitted from the light sources 42 to a test pattern TP, enter the two-dimensional sensor 27 through the imaging forming lens 28. The two-dimensional sensor 27 converts the light beams that have entered the two-dimensional sensor 27, into an analog signal by a light-to-electricity conversion, and outputs the analog signal as a captured image of the test pattern TP.

Figure 12:
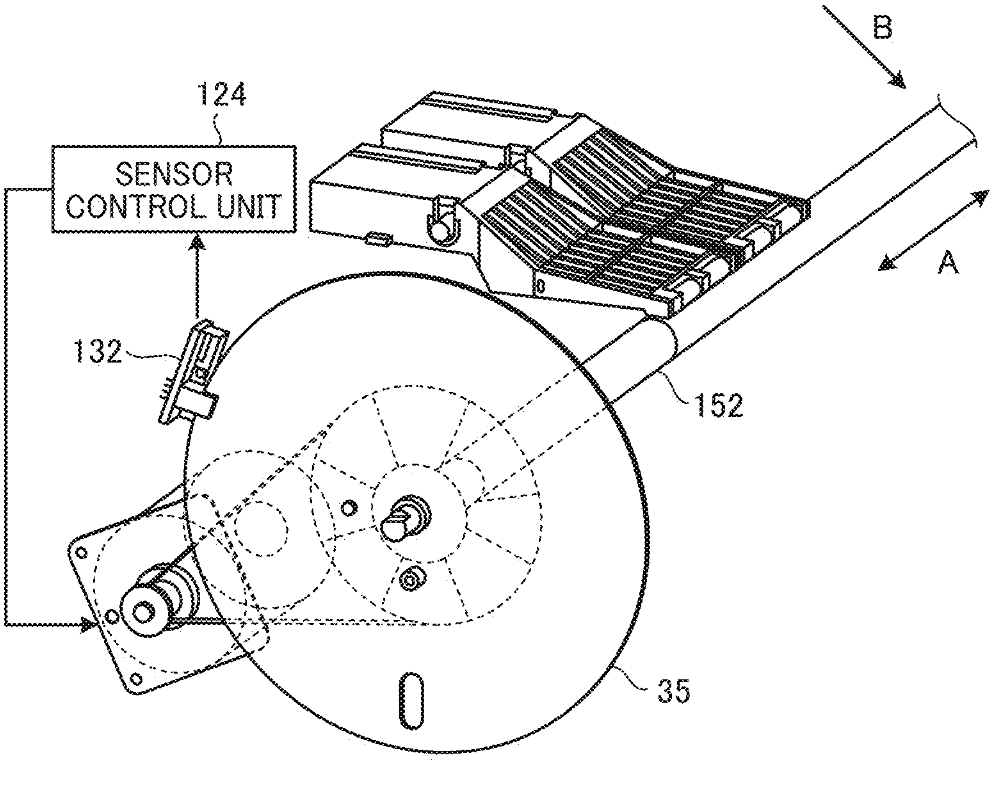
FIG. 12 is a configuration diagram of an example of the surroundings of a conveyance roller included in the image forming apparatus according to the present embodiment.

Next, a conveyance unit that conveys a recording medium P, which is an object to be conveyed, will be described. FIG. 12 is a configuration diagram of an example of the surroundings of a conveyance roller included in the image forming apparatus according to the present embodiment. As illustrated in FIG. 12, a recording medium P is intermittently conveyed in the sub-scanning direction (a direction of an arrow B in the drawing) orthogonal to the main-scanning directions (directions of arrows A in the drawing), which are moving directions of the carriage 5. At this time, an encoder 35 provided coaxially with a conveyance roller 152 is read by a sub-scanning encoder sensor 132 provided for a side board.

On the basis of the information read in this manner, the conveyance amount of the recording medium P is controlled by a sensor control unit 124 (see FIG. 13) electrically coupled to the sub-scanning encoder sensor 132. In this example, the encoder 35 is a rotary encoder, includes an optical grating arranged in a disk shape, and allows the detection of the angle, the rotation amount, the rotation speed, and the like.

Next, a hardware configuration of the image forming apparatus 100 according to the present embodiment will be described with reference to FIG. 13.

Figure 13:
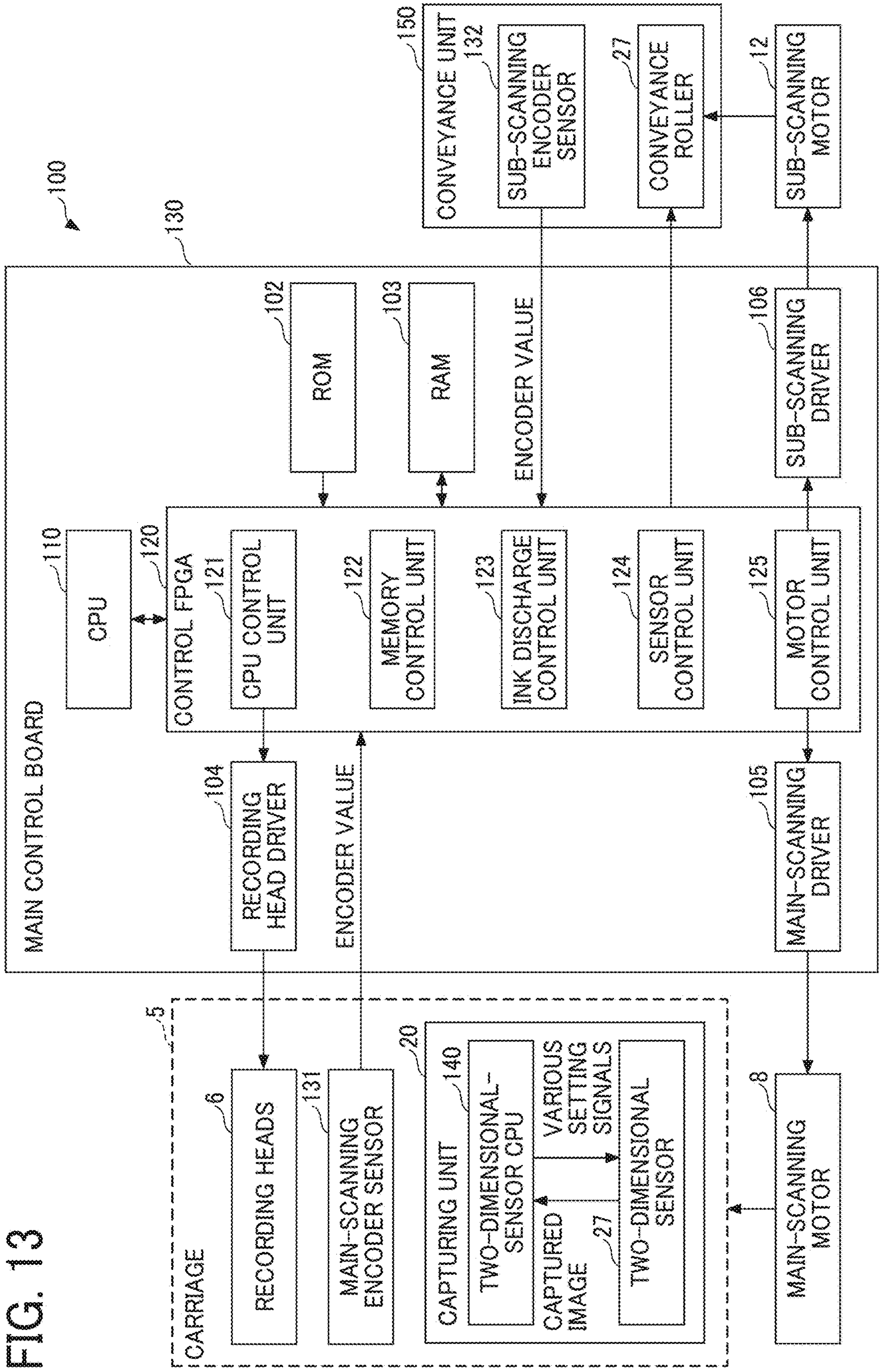
FIG. 13 is a hardware configuration diagram of the image forming apparatus according to the present embodiment.

As illustrated in FIG. 13, the image forming apparatus 100 according to the present embodiment includes a central processing unit (CPU) 110, a read-only memory (ROM) 102, a random-access memory (RAM) 103, a recording head driver 104, a main-scanning driver 105, a sub-scanning driver 106, a control field-programmable gate array (FPGA) 120, the recording heads 6, the main-scanning encoder sensor 131, the capturing unit 20, the main-scanning motor 8, a conveyance unit 150, and the sub-scanning motor 12.

The CPU 110, the ROM 102, the RAM 103, the recording head driver 104, the main-scanning driver 105, the sub-scanning driver 106, and the control FPGA 120 are mounted on a main control board 130. The recording heads 6, the main-scanning encoder sensor 131, and the capturing unit 20 are mounted on the carriage 5 as described above. The sub-scanning encoder sensor 132 and the conveyance roller 152 are mounted on the above-described conveyance unit 150.

The CPU 110 controls the entire image forming apparatus 100. For example, the CPU 110 uses the RAM 103 as a work area to execute various control programs stored in the ROM 102, and output control commands for controlling various operations in the image forming apparatus 100. In particular, in the image forming apparatus 100 according to the present embodiment, functions, such as a function of forming a test pattern TP, are implemented by the CPU 110. Details of these functions will be described later.

The recording head driver 104, the main-scanning driver 105, and the sub-scanning driver 106 are drivers for driving the recording heads 6, the main-scanning motor 8, and the sub-scanning motor 12, respectively. The control FPGA 120 operates with the CPU 110 to control various operations in the image forming apparatus 100. The control FPGA 120 includes, as functional components, for example, a CPU control unit 121, a memory control unit 122, an ink discharge control unit 123, the sensor control unit 124, and a motor control unit 125.

The CPU control unit 121 communicates with the CPU 110 to transmit, to the CPU 110, various types of information acquired by the control FPGA 120, and control commands output from the CPU 110 are input into the CPU control unit 121. The memory control unit 122 performs memory control to allow the CPU 110 to access the ROM 102 and the RAM 103. The ink discharge control unit 123 controls the operation of the recording head driver 104 in accordance with a control command from the CPU 110 to control the discharge timings of inks from the recording heads 6 driven by the recording head driver 104.

The sensor control unit 124 performs processing on sensor signals, such as encoder values output from the main-scanning encoder sensor 131 and the sub-scanning encoder sensor 132. For example, on the basis of an encoder value output from the main-scanning encoder sensor 131, the sensor control unit 124 executes processing to calculate the position, moving speed, moving direction, and the like of the carriage 5. For example, on the basis of an encoder value output from the sub-scanning encoder sensor 132, the sensor control unit 124 executes processing to calculate the rotation speed, rotation direction, and the like of the conveyance roller 152 that conveys a recording medium P.

The motor control unit 125 controls the operation of the main-scanning driver 105 in accordance with a control command from the CPU 110, so that the main-scanning motor 8 driven by the main-scanning driver 105 is controlled to control the movement of the carriage in the main-scanning directions. The motor control unit 125 also controls the operation of the sub-scanning driver 106 in accordance with a control command from the CPU 110, so that the sub-scanning motor 12 driven by the sub-scanning driver 106 is controlled to control the movement (conveyance) of a recording medium P in the sub-scanning directions by the conveyance roller 152.

Each of the above units is an example of a control function implemented by the control FPGA 120. In addition to these control functions, various control functions may be implemented by the control FPGA 120.

All or part of the above control functions may be implemented by programs executed by the CPU 110 or another general-purpose CPU. Part of the above control functions may be implemented by dedicated hardware, such as another FPGA different from the control FPGA 120, or an application-specific integrated circuit (ASIC).

The recording heads 6 include a plurality of nozzles that discharges inks to form an image (see FIG. 3), and are driven by the recording head driver 104 whose operations are controlled by the CPU 110 and the control FPGA 120, to discharge liquids, such as the inks, to a recording medium P on the platen 16 to form (print) various images.

The main-scanning encoder sensor 131 detects marks on the encoder sheet 14 to obtain an encoder value, and outputs the encoder value to the control FPGA 120. The encoder value is used by the sensor control unit 124 of the control FPGA 120 to calculate the position, moving speed, and moving direction of the carriage 5. The position, moving speed, and moving direction of the carriage 5 calculated from the encoder value by the sensor control unit 124 are sent to the CPU 110. On the basis of the position, moving speed, and moving direction of the carriage 5, the CPU 110 generates a control command for controlling the main-scanning motor 8, and outputs the control command to the motor control unit 125.

The capturing unit 20 captures a test pattern TP formed on a recording medium P under the control of the CPU 110, and performs various processing on the captured image. The capturing unit 20 includes a two-dimensional-sensor CPU 140 and the two-dimensional sensor 27. As described above, the two-dimensional sensor 27 is a CCD sensor, a CMOS sensor, or the like, and captures a test pattern TP and a reference frame (frame line) F under predetermined operation conditions based on various setting signals sent from the two-dimensional-sensor CPU 140. Then the two-dimensional sensor 27 sends the captured image to the two-dimensional-sensor CPU 140.

The two-dimensional-sensor CPU 140 controls the two-dimensional sensor 27 and performs processing on an image captured by the two-dimensional sensor 27. More specifically, the two-dimensional-sensor CPU 140 sends various setting signals to the capturing unit 20 to set various operation conditions of the two-dimensional sensor 27. The two-dimensional-sensor CPU 140 also implements a function of computing functions, such as a function of detecting markers of a test pattern TP from a captured image obtained by capturing the test pattern TP.

The capturing unit 20 also includes a RAM and a ROM. For example, the two-dimensional-sensor CPU 140 uses the RAM as a work area to execute various control programs stored in the ROM, and output control commands for controlling various operations in the capturing unit 20. The two-dimensional-sensor CPU 140 also has a function of performing an analog-to-digital (AD) conversion from an analog signal obtained by a light-to-electricity conversion by the two-dimensional sensor 27, into digital image data, and performing, on the image data, various types of image processing, such as shading correction, white balance correction, $\gamma$ correction, and format conversion of image data. Some or all of the various types of image processing on the captured image may be performed outside the capturing unit 20.

The sub-scanning encoder sensor 132 outputs, to the control FPGA 120, an encoder value obtained by reading the encoder 35. The encoder value is used by the sensor control unit 124 of the control FPGA 120 to calculate the rotation speed and the rotation direction of the conveyance roller 152 that conveys a recording medium P. The rotation speed and the rotation direction of the conveyance roller 152 calculated from the encoder value by the sensor control unit 124 are sent to the CPU 110. On the basis of the rotation speed and the rotation direction of the conveyance roller 152, the CPU 110 generates a control command for controlling the sub-scanning motor 12, and outputs the control command to the motor control unit 125. The conveyance roller 152 rotates at a rotation speed and in a rotation direction based on the control command received from the motor control unit 125, to convey a recording medium P by a predetermined conveyance amount.

In the image forming apparatus 100 according to the present embodiment, the recording head driver 104, the main-scanning driver 105, and the sub-scanning driver 106 controlled by the CPU 110 and the control FPGA 120 described above, and the recording heads 6, the main-scanning motor 8, and the sub-scanning motor 12 driven by the recording head driver 104, the main-scanning driver 105, and the sub-scanning driver 106 constitute an image forming unit that forms various images on a recording medium P.

In FIG. 13, the two-dimensional-sensor CPU 140 and the capturing unit 20 are mounted on the carriage 5, but it is sufficient if the two-dimensional-sensor CPU 140 and the capturing unit 20 are arranged so as to appropriately capture a test pattern TP on a recording medium P. The two-dimensional-sensor CPU 140 and the capturing unit 20 may not necessarily be mounted on the carriage 5.

Figure 14:
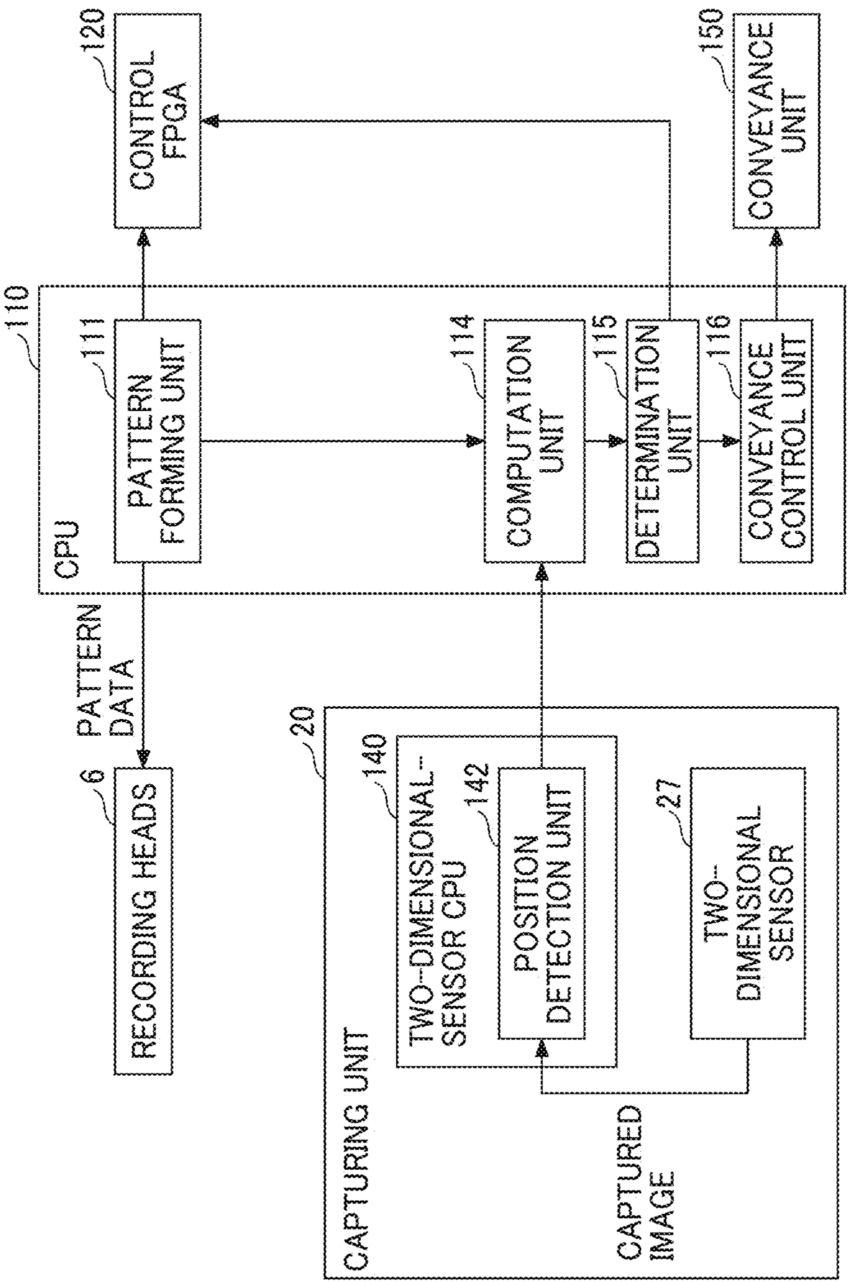
FIG. 14 is a block diagram illustrating an example of a functional configuration of the image forming apparatus according to the present embodiment.

Next, characteristic functions implemented by the CPU 110 and the two-dimensional-sensor CPU 140 of the image forming apparatus 100 will be described with reference to FIG. 14.

For example, the CPU 110 uses the RAM 103 as a work area to execute control programs stored in the ROM 102 so as to implement functions of a pattern forming unit 111, a computation unit 114, a determination unit 115, a conveyance control unit 116, and the like. For example, the two-dimensional-sensor CPU 140 of the capturing unit 20 uses the RAM as a work area to implement control programs stored in the ROM to implement functions of the position detection unit 142 and the like.

The conveyance control unit 116 of the CPU 110 controls the conveyance roller 152 of the conveyance unit 150 that conveys a recording medium P. For example, the conveyance control unit 116 determines the rotation speed, rotation direction, and the like of the conveyance roller 152 on the basis of an encoder value output from the sub-scanning encoder sensor 132, and sends out a control command indicating the rotation speed and the rotation direction, to the conveyance roller 152 of the conveyance unit 150 via the control FPGA 120, to control the conveyance of a recording medium P by the conveyance roller 152.

The pattern forming unit 111 (an example of a printing unit) of the CPU 110 reads, for example, pattern data preliminarily stored in the ROM 102 or the like, and makes the above-described image forming unit perform an image forming operation in accordance with the pattern data, to form (print) a test pattern TP on a recording medium P. The test pattern TP formed on the recording medium P by the pattern forming unit 111 is captured by the capturing unit 20.

In the present embodiment, the test pattern TP includes a set M of markers including at least a first marker M1 and a pair of second markers M2*a* and M2*b*. Details of the test pattern TP will be described later (see FIG. 15).

The pattern forming unit 111 forms a first marker M1 or a pair of second markers M2*a* and M2*b* (an example of a reference adjustment pattern) on a recording medium P using the image forming unit, and the recording medium P is conveyed by a predetermined conveyance amount, and then the pattern forming unit 111 forms a first marker M1 or a pair of second markers M2*a* and M2*b* not formed before the conveyance (an example of an adjustment pattern).

In the present embodiment, an example will be described in which the pattern forming unit 111 forms a first marker M1 on a recording medium P, then the recording medium P is conveyed by a predetermined conveyance amount, then the recording medium P is conveyed again by the predetermined conveyance amount, and then the pattern forming unit 111 forms a pair of second markers M2*a* and M2*b*. However, the first marker M1 and the second markers M2*a* and M2*b* may be formed in either order. For example, the pattern forming unit 111 may form a pair of second markers M2*a* and M2*b* on a recording medium P, then the recording medium P is conveyed by a predetermined conveyance amount, and then the pattern forming unit 111 may form the first marker M1. In the present embodiment, the pattern forming unit 111 forms a test pattern TP using the three recording heads 6A, 6B, and 6C, but may form a test pattern TP with one or more recording heads 6 including a plurality of nozzles arrayed in the sub-scanning direction.

Figure 15:
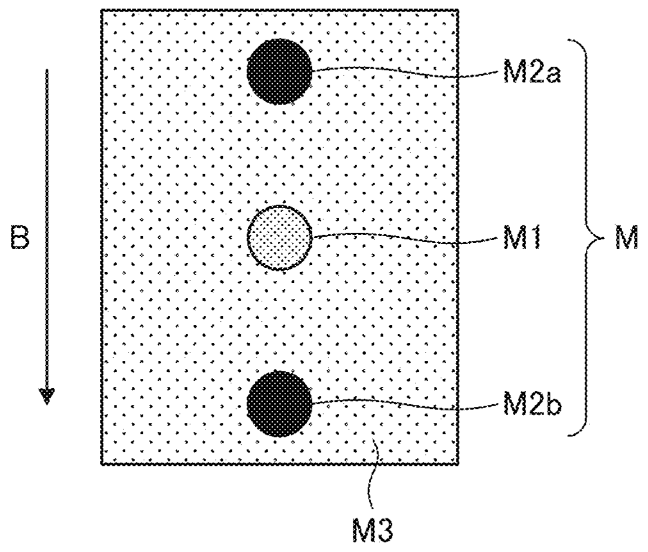
FIG. 15 is a diagram illustrating an example of a test pattern formed on a recording medium by the image forming apparatus according to the present embodiment.

The test pattern TP will be described with reference to FIG. 15. As illustrated in FIG. 15, a test pattern TP includes a set M of markers including at least a first marker M1 and a pair of second markers M2*a* and M2*b*. In the test pattern TP illustrated in FIG. 15, the first marker M1 is arranged in the middle between the pair of second markers M2*a* and M2*b*. The first marker M1 and the pair of second markers M2*a* and M2*b* are formed with dots, and formed along the sub-scanning direction (a direction of an arrow B in the drawing), which is the conveyance direction of a recording medium P. That is, in the present embodiment, the first marker M1 is an example of a reference adjustment pattern printed on a recording medium P using any nozzle among the nozzles of the recording heads 6 (an example of a reference nozzle). The second markers M2*a* and M2*b* are an example of an adjustment pattern printed by a nozzle (an example of a designated nozzle) apart by a predetermined distance from a nozzle, as the reference, apart by a predetermined conveyance amount in the sub-scanning direction from the reference nozzle when the recording medium P is conveyed from the reference nozzle in the sub-scanning direction by the predetermined conveyance amount.

Referring back to FIG. 14, the position detection unit 142 is an example of a detection unit that detects, from an image captured by the two-dimensional sensor 27, a first marker M1 and second markers M2 included in a test pattern TP.

The computation unit 114 is an example of a computation unit that, on the basis of a detection result of the first marker M1 and the second markers M2 by the position detection unit 142, computes the distances between the first marker M1 and the second markers M2 in the sub-scanning direction. The determination unit 115 is an example of a determination unit that determines whether or not the standard deviation (an example of dispersion) of the distances computed by the computation unit 114 is equal to or larger than a predetermined value. In a case where the standard deviation is equal to or larger than the predetermined value, the determination unit 115 may determine that there is a deflection in the discharge of the liquid from the reference nozzle or the designated nozzle. As a result, it is determined whether or not there is a deflection in the discharge of the ink from the reference nozzle or the designated nozzle, and thus, the deviation amount of the image is detected with high precision. In a case where it is determined that the standard deviation is equal to or larger than the predetermined value, the determination unit 115 also functions as an example of a notification unit that provides notification that the standard deviation is equal to or larger than the predetermined value. Alternatively, in a case where the standard deviation is equal to or larger than the predetermined value, and it is determined that there is a deflection in the discharge of the ink from the reference nozzle or the designated nozzle, the determination unit 115 may provide notification that there is a deflection in the discharge of the ink from the reference nozzle or the designated nozzle.

Figure 16A:
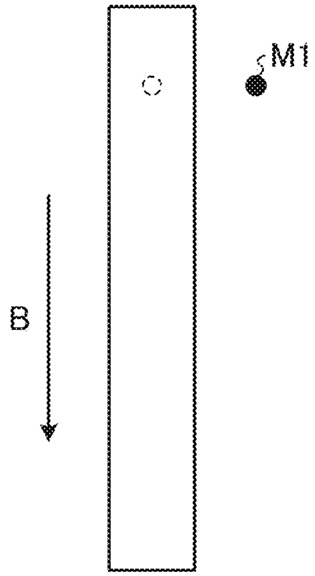
FIG. 16A is an explanatory diagram of an example of a test pattern forming method in the image forming apparatus according to the present embodiment.
Figure 16B:
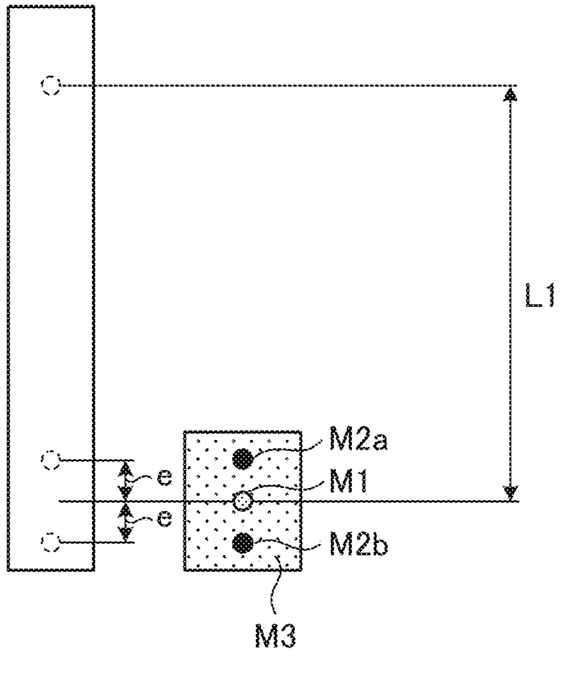
FIG. 16B is an explanatory diagram of an example of a test pattern forming method in the image forming apparatus according to the present embodiment.
Figure 17:
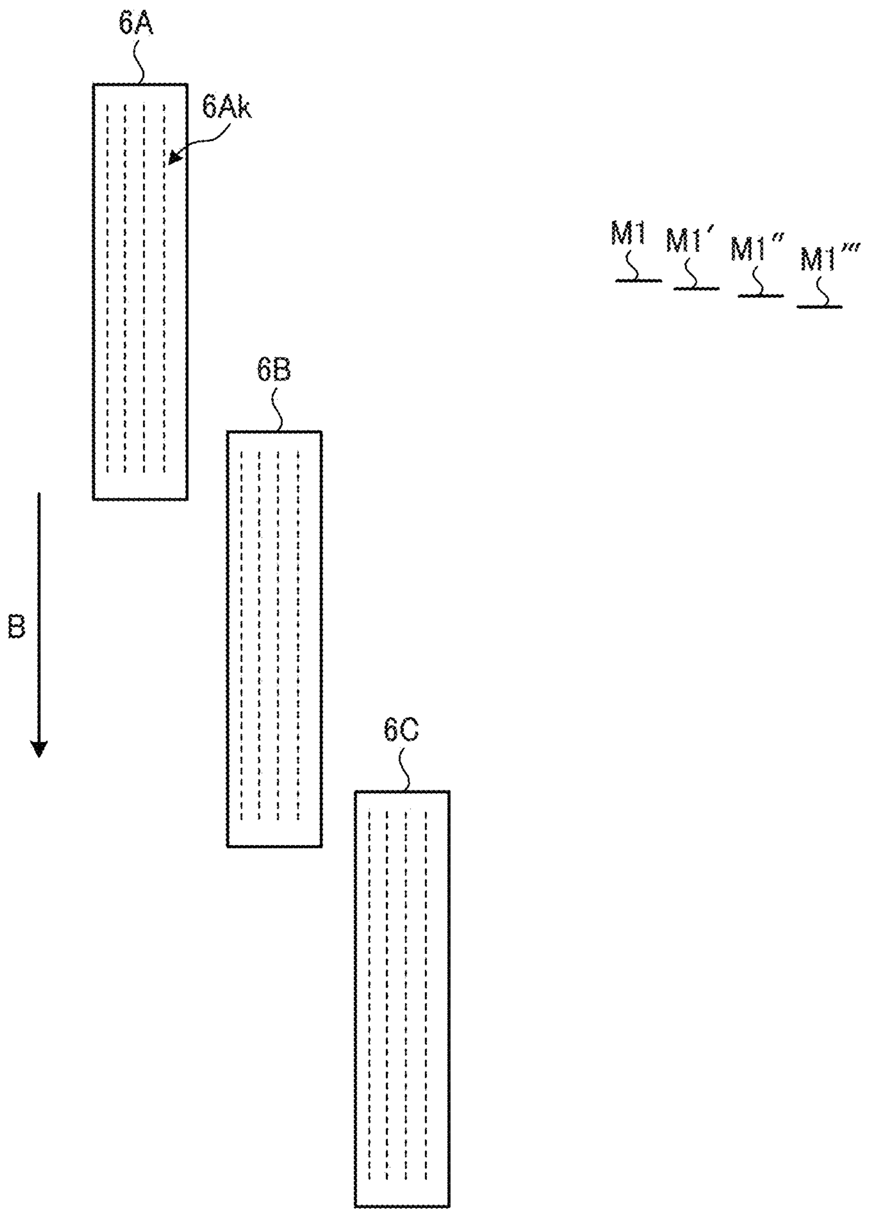
FIG. 17 is an explanatory diagram of an example of a test pattern forming method in the image forming apparatus according to the present embodiment.
Figure 18:
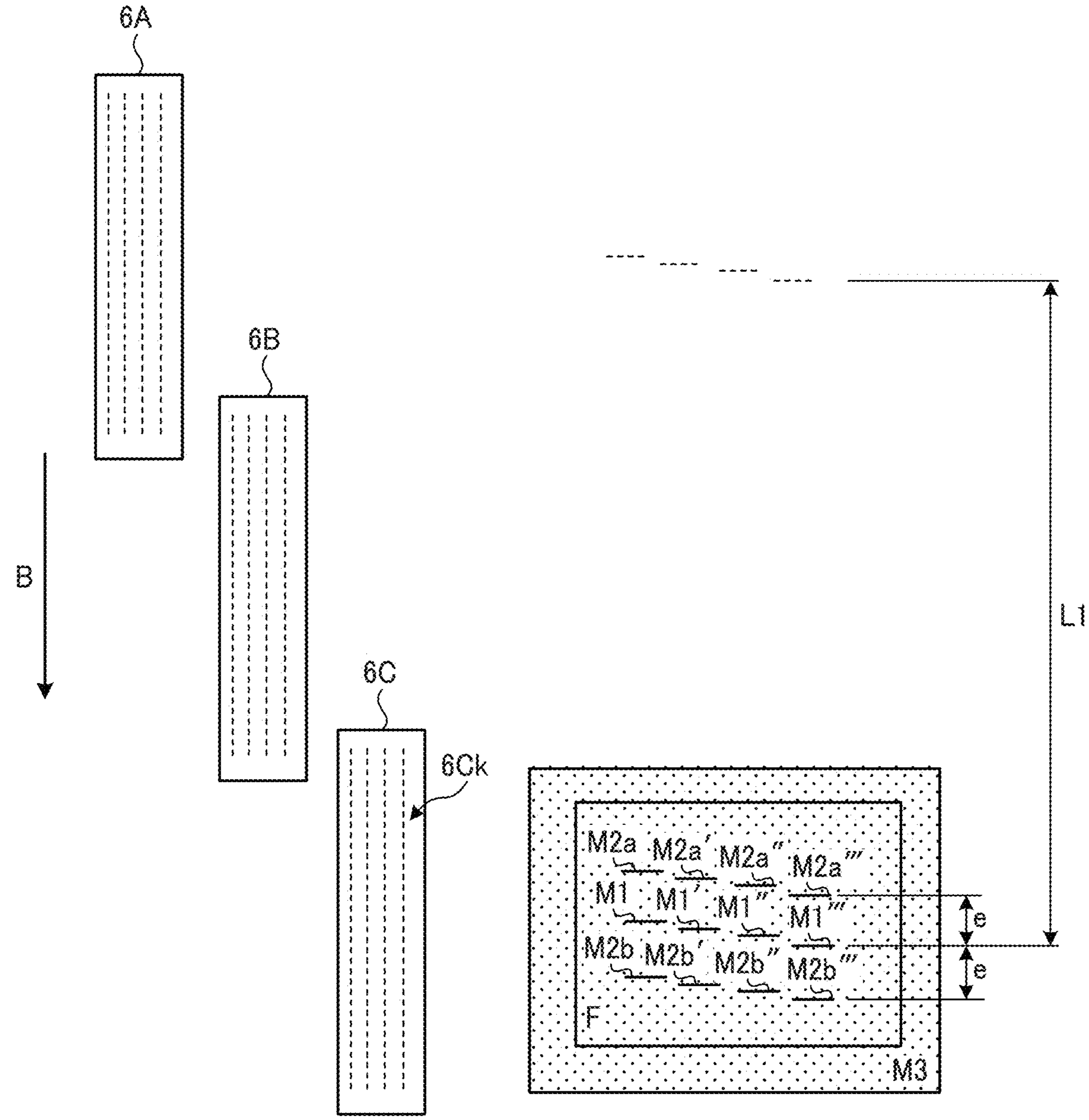
FIG. 18 is an explanatory diagram of an example of a test pattern forming method in the image forming apparatus according to the present embodiment.
Figure 19:
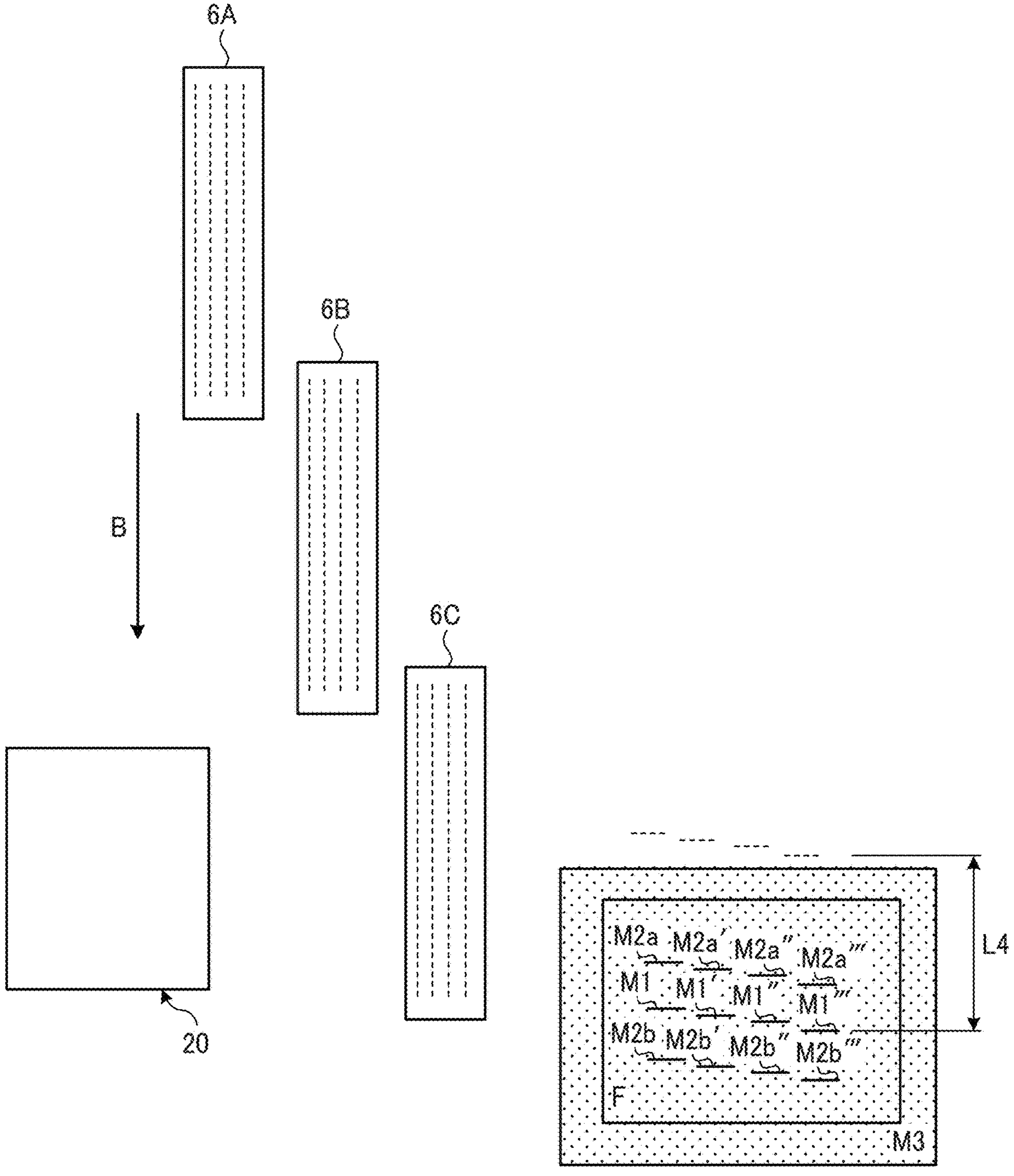
FIG. 19 is an explanatory diagram of an example of a test pattern forming method in the image forming apparatus according to the present embodiment.

Next, a method for forming the test pattern TP will be described. FIGS. 16A and 16B to 20 are explanatory diagrams of an example of a test pattern forming method in the image forming apparatus according to the present embodiment. First, as illustrated in FIG. 16A, the pattern forming unit 111 forms a first marker M1 on a recording medium P. Next, as illustrated in FIG. 16B, the conveyance control unit 116 conveys the recording medium P by a predetermined conveyance amount L1 (actual conveyance amount L1) in the sub-scanning direction (a direction of an arrow B in the drawing) with the conveyance roller 152. After the recording medium P is conveyed by the predetermined conveyance amount L1 in the sub-scanning direction, the pattern forming unit 111 forms second markers M2*a* and M2*b*. The pair of second markers M2*a* and M2*b* are formed by two nozzles (an example of the designated nozzle) apart by a predetermined distance e both in the forward and backward sub-scanning directions from a nozzle, as the reference, apart by an ideal conveyance amount L1 from a nozzle that has formed the first marker M1. Hereinafter, the nozzle as the reference may be referred to as a reference nozzle, and the two nozzles apart by the predetermined distance e in the forward and backward sub-scanning directions from the reference nozzle may be referred to as designated nozzles.

Therefore, in a case where the actual conveyance amount L1 actually conveyed and the ideal conveyance amount L1 are the same, a test pattern TP is formed in which the first marker M1 is formed at an ideal position, which is the sub-scanning-direction intermediate position between the pair of second markers M2*a* and M2*b*. On the other hand, if the actual conveyance amount L1 is different from the ideal conveyance amount L1, a test pattern TP is formed in which, for example, the first marker M1 is formed at a position between the pair of second markers M2*a* and M2*b* but closer to one of the pair of second markers M2*a* and M2*b*.

Then the capturing unit 20 captures the test pattern TP and computes the relative positional relationship between the first marker M1 and the pair of second markers M2*a* and M2*b* to obtain the deviation amount between the actual conveyance amount L1 and the ideal conveyance amount L1. In the present embodiment, an example in which the ideal position of the first marker M1 is the intermediate position between the pair of second markers M2*a* and M2*b* will be described, but the ideal position may not be the intermediate position between the pair of second markers M2*a* and M2*b*. That is, if the first marker M1 is formed at a predetermined position where the first marker M1 can be captured together with the pair of second markers M2*a* and M2*b*, the ideal position of the first marker M1 may be a position closer to one of the pair of second markers M2*a* and M2*b*, or may not be between the pair of second markers M2*a* and M2*b*.

A usage example in an actual machine will be described. When the user sets the type of a recording medium P in a main body of a printing apparatus and selects a specific type, the CPU 110 that controls the entire image forming apparatus 100 outputs, to the pattern forming unit 111, a test pattern TP in accordance with the method for forming the test pattern TP described with reference to FIGS. 16A and 16B. First markers M1, M1', M1'', and M1''' are formed with a 6Ak nozzle row arranged on the recording head 6A on the upstream side of the conveyance direction of the recording medium P (see FIG. 17).

The first markers M1, M1', M1'', and M1''' formed on the recording medium P are intermittently conveyed N times by a total conveyance distance (conveyance amount) L1, to the position of the recording head 6C, and then pairs of second markers M2*a*, M2*a*', M2*a*'', M2*a*''', M2*b*, M2*b*', M2*b*'', and M2*b*''', and a frame line F are formed. Nozzles used to form the pairs of second markers M2*a*, M2*a*', M2*a*'', M2*a*''', M2*b*, M2*b*', M2*b*'', and M2*b*''' are nozzles that have a positional relationship with each other that is an equal distance (predetermined distance) e with respect to the first markers M1, M1', M1'', and M1''' when the first markers M1, M1', M1'', and M1''' are conveyed by an ideal conveyance distance (conveyance amount) L1 (see FIG. 18).

The recording head 6C forms the pairs of second markers M2*a*, M2*a*', M2*a*'', M2*a*''', M2*b*, M2*b*', M2*b*'', and M2*b*''', and the frame line F to complete the test pattern TP, and then the test pattern TP is conveyed by a distance L4 to move the test pattern TP to a region that can be captured by the capturing unit 20. That is, the pattern forming unit 111 prints, on the recording medium P, the test pattern TP including the plurality of first markers M1, M1', M1'', and M1''' and the plurality of second markers M2*a*, M2*a*', M2*a*'', M2*a*''', M2*b*, M2*b*', M2*b*'', and M2*b*''' at different positions in the main-scanning direction. After the test pattern TP moves to the region that can be captured by the capturing unit 20, the capturing unit 20 captures the test pattern TP. The position detection unit 142 detects the first markers M1, M1', M1'', and M1''' and the pairs of second markers M2*a*, M2*a*', M2*a*'', M2*a*''', M2*b*, M2*b*', M2*b*'', and M2*b*''' included in the captured test pattern TP. Next, the computation unit 114 computes relative positional relationships between the first markers M1, M1', M1'', and M1''' and the pairs of second markers M2*a*, M2*a*', M2*a*'', M2*a*''', M2*b*, M2*b*', M2*b*'', and M2*b*''' (see FIG. 19).

Figure 20:
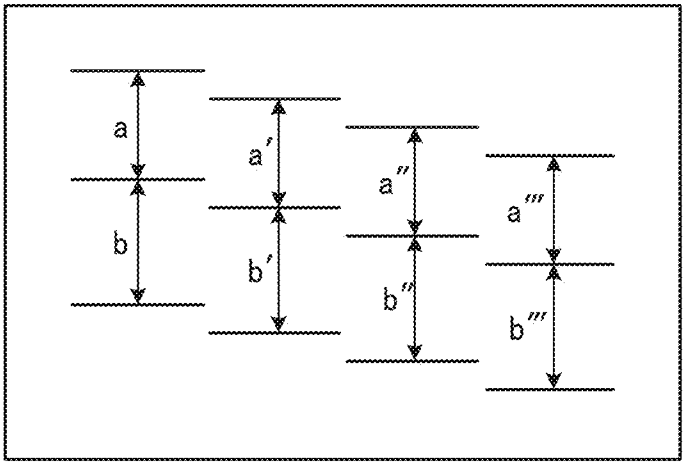
FIG. 20 is an explanatory diagram of an example of a test pattern forming method in the image forming apparatus according to the present embodiment.

More specifically, as illustrated in FIG. 20, the computation unit 114 computes, as the relative positional relationships, distances a, a', a'', a''', b, b', b'', and b''' between the first markers M1, M1', M1'', and M1''' and the pairs of second markers M2*a*, M2*a*', M2*a*'', M2*a*''', M2*b*, M2*b*', M2*b*'', and M2*b*'''. In this case, the determination unit 115 computes the standard deviation of the distances a, a', a'', and a''' (or the distances b, b', b'', and b''), and determines whether or not the standard deviation is equal to or larger than a preset value (an example of a predetermined value). In a case where the standard deviation is equal to or larger than the preset value, the determination unit 115 determines that there is a deflection in the discharge of the ink from the reference nozzle or the designated nozzle. In a case where it is determined that the standard deviation is equal to or larger than the preset value, or in a case where it is determined that there is a deflection in the discharge of the ink, the determination unit 115 notifies the user, through an operation screen of the image forming apparatus 100 or the like, that the standard deviation is equal to or larger than the preset value, or that there is a deflection in the discharge of the ink. Alternatively, nozzle cleaning of the printhead may be performed, and the pattern forming unit 111 may print another test pattern TP and perform the detection of the test pattern TP again. However, in a case, such as a case where the entire recording heads 6 are inclined, or a case where all the nozzles for printing the test pattern TP discharge the inks in the same deflected direction, the ink discharge deflection is not detected.

In this embodiment, drawn as the test pattern TP are a total of four patterns of the first markers M1, M1', M1'', and M1''' and the pairs of second markers M2*a*, M2*a*', M2*a*'', M2*a*''', M2*b*, M2*b*', M2*b*'', and M2*b*''', but the number of the patterns is not limited to four. A black ink is used to form the first markers M1, M1', M1'', and M1''' and the pairs of second markers M2*a*, M2*a*', M2*a*'', M2*a*''', M2*b*, M2*b*', M2*b*'', and M2*b*''' of the test pattern TP, but an ink of another color may be used. Different colors may be used for the first markers M1, M1', M1'', and M1''' and the pairs of second markers M2*a*, M2*a*', M2*a*'', M2*a*''', M2*b*, M2*b*', M2*b*'', and M2*b*'''.

As described above, according to the image forming apparatus 100 according to the present embodiment, it is determined whether or not there is a deflection in the discharge of the ink from the reference nozzle or the designated nozzle, and thus the deviation amount of the image is detected with high precision.

The programs executed by the image forming apparatus 100 of the present embodiment are preliminarily embedded in the ROM 102 or the like to be provided. The programs executed by the image forming apparatus 100 of the present embodiment may be recorded as a file in an installable format or an executable format, in a computer-readable recording medium, such as a compact disc read-only memory (CD-ROM), a flexible disk (FD), a compact disc-recordable (CD-R), or a digital versatile disk (DVD), to be provided.

The programs executed by the image forming apparatus 100 of the present embodiment may be stored on a computer connected to a network, such as the Internet, and downloaded via the network to be provided. The programs executed by the image forming apparatus 100 of the present embodiment may be provided or distributed via a network, such as the Internet.

The programs executed by the image forming apparatus 100 of the present embodiment has a module configuration including the above-described units (pattern forming unit 111, computation unit 114, determination unit 115, conveyance control unit 116, and position detection unit 142). As actual hardware, the CPU 110 or the two-dimensional-sensor CPU 140 (an example of a processor) reads the programs from the ROM 102 or the like and executes the programs, so that the above-described units are loaded into a main memory to generate, in the main memory, the pattern forming unit 111, the computation unit 114, the determination unit 115, the conveyance control unit 116, and the position detection unit 142.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus comprising:

a recording head including a plurality of nozzles;

processing circuitry configured to:

print a reference adjustment pattern on a recording medium using a reference nozzle, which is one of the plurality of nozzles;

when the recording medium is conveyed from the reference nozzle in a sub-scanning direction by a predetermined conveyance amount, print an adjustment pattern on the recording medium using a designated nozzle, which is one of the plurality of nozzles and apart by a predetermined distance with respect to a nozzle apart from the reference nozzle in the sub scanning direction by the predetermined conveyance amount;

detect the reference adjustment pattern and the adjustment pattern;

compute a distance between the reference adjustment pattern and the adjustment pattern in the sub-scanning direction; and determine whether a standard deviation of the distance computed is equal to or larger than a predetermined value.

2. The image forming apparatus according to claim 1, wherein the processing circuitry is configured to print the adjustment pattern and another adjustment pattern on the recording medium, using the designated nozzle and another designated nozzle, which are apart forward and backward in the sub-scanning direction by the predetermined distance with respect to the nozzle apart from the reference nozzle in the sub-scanning direction by the predetermined conveyance amount.

3. The image forming apparatus according to claim 1, wherein the processing circuitry is configured to print, on the recording medium, a plurality of reference adjustment patterns, including the reference adjustment pattern, and a plurality of adjustment patterns, including the adjustment pattern, at different positions in a main-scanning direction.

4. The image forming apparatus according to claim 1, wherein the processing circuitry is configured to, in a case where it is determined that the standard deviation is equal to or larger than the predetermined value, provide notification that the standard deviation is equal to or larger than the predetermined value.

5. The image forming apparatus according to claim 1, wherein the processing circuitry is configured to, in a case where it is determined that there is a deflection in liquid discharge from the reference nozzle or the designated nozzle, print the reference adjustment pattern and the adjustment pattern again.

6. An image forming method to be executed by an image forming apparatus that includes a recording head having a plurality of nozzles, the method comprising:

printing a reference adjustment pattern on a recording medium using a reference nozzle, which is one of the plurality of nozzles;

when the recording medium is conveyed from the reference nozzle in a sub-scanning direction by a predetermined conveyance amount, printing an adjustment pattern on the recording medium using a designated nozzle, which is one of the plurality of nozzles and apart by a predetermined distance with respect to a nozzle apart from the reference nozzle in the sub-scanning direction by the predetermined conveyance amount;

detecting the reference adjustment pattern and the adjustment pattern;

computing a distance between the reference adjustment pattern and the adjustment pattern in the sub-scanning direction; and determining whether a standard deviation of the distance between the reference adjustment pattern and the adjustment pattern is equal to or larger than a predetermined value.

7. A non-transitory storage medium storing a plurality of instructions which, when executed by one or more processors, causes the processors to perform a method, the method comprising:

printing a reference adjustment pattern on a recording medium using a reference nozzle, which is one of a plurality of nozzles of a recording head, when the recording medium is conveyed from the reference nozzle in a sub-scanning direction by a predetermined conveyance amount, printing an adjustment pattern on the recording medium using a designated nozzle, which is one of the plurality of nozzles and apart by a predetermined distance with respect to a nozzle apart from the reference nozzle in the sub-scanning direction by the predetermined conveyance amount;

detecting the reference adjustment pattern and the adjustment pattern;

computing a distance between the reference adjustment pattern and the adjustment pattern in the sub-scanning direction; and determining whether a standard deviation of the distance between the reference adjustment pattern and the adjustment pattern is equal to or larger than a predetermined value.

* * * * *